United States Patent
Adam et al.

(10) Patent No.: US 11,829,766 B2
(45) Date of Patent: Nov. 28, 2023

(54) COMPLIANCE ENFORCEMENT VIA SERVICE DISCOVERY ANALYTICS

(71) Applicant: International Business Machines Corporation, Armonk, NY (US)

(72) Inventors: Constantin Mircea Adam, Norwalk, CT (US); Shripad Nadgowda, Elmsford, NY (US); James R. Doran, New Milford, CT (US); John Rofrano, Mahopac, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

(21) Appl. No.: 17/307,482

(22) Filed: May 4, 2021

(65) Prior Publication Data
US 2022/0357954 A1 Nov. 10, 2022

(51) Int. Cl.
| | | |
|---|---|---|
| G06F 9/38 | (2018.01) | |
| G06F 8/30 | (2018.01) | |
| G06F 8/75 | (2018.01) | |
| G06F 11/36 | (2006.01) | |

(52) U.S. Cl.
CPC .............. *G06F 9/3838* (2013.01); *G06F 8/30* (2013.01); *G06F 8/75* (2013.01); *G06F 11/3604* (2013.01)

(58) Field of Classification Search
CPC . G06F 8/38; G06F 8/75; G06F 9/3838; G06F 11/3604
See application file for complete search history.

(56) References Cited

U.S. PATENT DOCUMENTS

| | | |
|---|---|---|
| 7,805,463 B2 | 9/2010 | Bevan et al. |
| 8,473,928 B2 | 6/2013 | Park et al. |
| 8,619,084 B2 | 12/2013 | Curbera et al. |
| 9,092,445 B2 | 7/2015 | Ojha |

(Continued)

FOREIGN PATENT DOCUMENTS

| | | |
|---|---|---|
| CN | 103049606 A | 4/2013 |
| CN | 106293648 A | 1/2017 |

OTHER PUBLICATIONS

Mell et al., "The NIST Definition of Cloud Computing," Recommendations of the National Institute of Standards and Technology, NIST Special Publication 800-145, Sep. 2011, 7 pages.

*Primary Examiner* — Ziaul A Chowdhury
(74) *Attorney, Agent, or Firm* — Amin, Turocy & Watson, LLP

(57) ABSTRACT

Systems and techniques that facilitate compliance enforcement via service discovery analytics are provided. In various embodiments, a system can comprise a receiver component that can access one or more declarative deployment manifests associated with a computing application. In various instances, the system can comprise a dependency component that can build a dependency topology based on the one or more declarative deployment manifests. In various cases, the dependency topology can indicate dependencies among one or more computing objects that are declared by the one or more declarative deployment manifests. In various aspects, the system can comprise a compliance component that can determine, based on the dependency topology, whether the computing application satisfies one or more compliance standards.

16 Claims, 11 Drawing Sheets

(56) References Cited

U.S. PATENT DOCUMENTS

| | | |
|---|---|---|
| 9,152,402 B2 | 10/2015 | Scheidel et al. |
| 9,621,428 B1 | 4/2017 | Lev et al. |
| 10,255,370 B2 | 4/2019 | Carpenter et al. |
| 11,573,786 B1 * | 2/2023 | Kiselev .................... G06F 8/10 |
| 2005/0091259 A1 * | 4/2005 | Parthasarathy ........... G06F 8/61 |
| | | 707/999.102 |
| 2005/0108678 A1 * | 5/2005 | Goodwin .................. G06F 8/20 |
| | | 717/100 |
| 2010/0162232 A1 * | 6/2010 | Bhatia ...................... G06F 8/60 |
| | | 717/178 |
| 2013/0055211 A1 * | 2/2013 | Fosback ................ G06Q 10/06 |
| | | 717/126 |
| 2016/0124742 A1 | 5/2016 | Rangasamy et al. |
| 2017/0302531 A1 | 10/2017 | Maes |
| 2017/0315796 A1 * | 11/2017 | Melnik ..................... G06F 8/60 |
| 2019/0303213 A1 * | 10/2019 | Chaganti .................. G06F 9/52 |
| 2021/0173670 A1 * | 6/2021 | Borra ................. G06F 11/3466 |

* cited by examiner

COMPLIANCE ENFORCEMENT VIA SERVICE DISCOVERY ANALYTICS

BACKGROUND

The subject disclosure relates to compliance enforcement of computing applications with compliance standards, and more specifically to facilitating compliance enforcement via service discovery analytics.

Today, most computing applications, such as cloud-native computing applications, do not exhibit monolithic architectures. Instead, such computing applications exhibit distributed architectures that include large numbers of loosely coupled micro services, where a microservice can be a discrete application that performs a discrete function. A computing application can be subject to one or more compliance standards, where a compliance standard can be a rule or regulation that governs the computing application. It can be straightforward to evaluate whether a monolithic computing application satisfies compliance standards. However, it can be much more difficult to evaluate whether a distributed computing application satisfies compliance standards. Accordingly, very few conventional computerized tools exist for determining whether a computing application that exhibits a distributed microservice architecture satisfies compliance standards. Some of those few conventional computerized tools that do exist examine process logs generated during runtime and/or deployment of the distributed computing application. However, it can take excessive amounts of time and/or resources to cure compliance issues that are discovered at runtime and/or deployment. Others of the few conventional computerized tools that do exist compare a distributed computing application with a predetermined template, to determine whether the distributed computing application calls a predetermined set of microservices in a predetermined order. However, it can often be the case that such a predetermined template is not known beforehand.

Accordingly, systems and/or techniques that can address one or more of the above-described technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate compliance enforcement via service discovery analytics are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a receiver component that can access one or more declarative deployment manifests associated with a computing application. In various instances, the computer-executable components can further comprise a dependency component that can build a dependency topology based on the one or more declarative deployment manifests. In various cases, the dependency topology can indicate dependencies among one or more computing objects that are declared by the one or more declarative deployment manifests. In various aspects, the computer-executable components can further comprise a compliance component that can determine, based on the dependency topology, whether the computing application satisfies one or more compliance standards.

According to one or more embodiments, the above-described system can be implemented as a computer-implemented method and/or computer program product.

DETAILED DESCRIPTION

Figure 1:
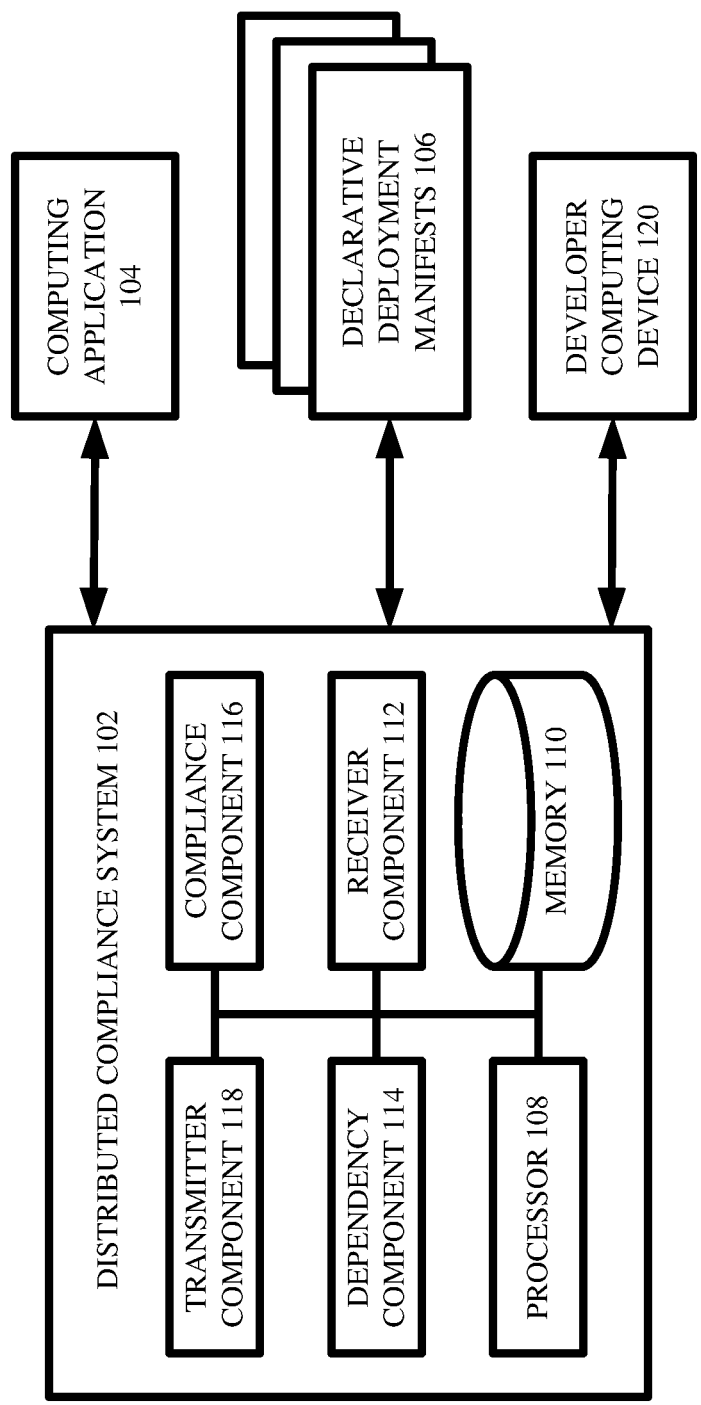
FIG. 1 illustrates a block diagram of an example, non-limiting system that facilitates compliance enforcement via service discovery analytics in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Many computing applications (e.g., computer-executable software programs) that are created today do not exhibit monolithic architectures. That is, the executable script (e.g., the source code) of such a computing application is not fully self-contained. Instead, such computing applications exhibit distributed architectures that include large numbers of loosely coupled microservices, where a microservice can be a discrete application that performs a discrete function. That is, the executable script of such a computing application can call/invoke one or more microservices, each of which can be defined by their own executable scripts. Because the executable script of a microservice can itself call/invoke any suitable number of other microservices, a distributed computing application can involve long, complicated chains/trees of microservices. Cloud-native computing applications are especially likely to exhibit such distributed architectures.

As mentioned above, a computing application can be subject to one or more compliance standards. As a non-limiting example, a compliance standard can be a rule or regulation that governs the configuration parameters (e.g., the properties, characteristics, and/or attributes) of the computing application. Such compliance standards can, for example, be promulgated by one or more governing entities that have oversight authority over the computing application, such as a standards-setting organization.

A monolithic computing application can be fully self-contained (e.g., can refrain from calling/invoking downstream microservices), and so it can be straightforward to evaluate whether the monolithic computing application satisfies compliance standards. That is, since a monolithic computing application does not depend upon any microservice that is external to the executable script of the monolithic computing application, compliance can be determined by analyzing the configuration parameters contained within its executable script.

On the other hand, because a distributed computing application is not fully self-contained (e.g., calls/invokes downstream microservices), it can be much more difficult to evaluate whether the distributed computing application satisfies compliance standards. That is, since a distributed computing application can depend upon microservices that are external to the executable script of the distributed computing application, and because a given microservice can itself depend upon other microservices that are external to the executable script of the given microservice, compliance cannot be determined merely by analyzing the configuration parameters contained in its executable script. Instead, the configuration parameters of the downstream microservices would also have to be analyzed.

For example, suppose that a computing application X facilitates its functionality by calling a microservice Y. In such case, the executable script of the computing application X can specify configuration parameters that define the computing application X. Moreover, the executable script of the microservice Y can specify configuration parameters that define the microservice Y. Furthermore, the executable script of the computing application X can call/invoke the microservice Y. Thus, the computing application X can be considered as depending upon the microservice Y. Note, however, that the executable script of the computing application X can lack the configuration parameters that define the microservice Y.

Because the computing application X can depend upon the microservice Y, the computing application X can be considered as compliant only if the microservice Y is also considered as compliant. Because the executable script of the computing application X does not specify the configuration parameters that define the microservice Y, the compliance status of the computing application X cannot be determined by only analyzing the executable script of the computing application X. Instead, the configuration parameters that define the microservice Y should also be analyzed.

Accordingly, there exist very few conventional computerized tools that can determine whether a distributed computing application satisfies compliance standards. Some of those few conventional computerized tools evaluate compliance by examining process logs generated during runtime and/or deployment of the distributed computing application. However, it can take excessive amounts of time and/or resources to cure compliance issues that are discovered at such a late stage. That is, the costs associated with curing a compliance issue can be minimized by detecting such compliance issue as early as possible. By waiting until runtime and/or deployment to cure the compliance issue, such costs can be unnecessarily large.

Others of such conventional computerized tools evaluate compliance by comparing the current structure of the distributed computing application with a predetermined structural template that is known to satisfy applicable compliance standards. In various cases, the predetermined structural template can specify a predetermined set of microservices that are to be called/invoked in a predetermined order. Because the predetermined structural template can be known to satisfy applicable compliance standards, the distributed computing application can be determined to be compliant if the current structure of the distributed computing application matches the predetermined structural template. However, in some cases, there might not be a predetermined structural template available. In other cases, a software developer might know that the current structure of the distributed computing application does not match the predetermined structural template but may desire to determine whether the current structure of the distributed computing application nevertheless satisfies compliance standards.

Systems and/or techniques that can address these technical problems can thus be desirable.

Various embodiments of the invention can address one or more of these technical problems. Specifically, various embodiments of the invention can provide systems and/or techniques that can facilitate compliance enforcement via service discovery analytics. In various cases, embodiments of the invention can be considered as a computerized tool (e.g., a combination of computer-executable hardware and/or computer-executable software) that can electronically analyze a distributed computing application to determine whether the distributed computing application satisfies one or more compliance standards. More specifically, the computerized tool can receive as input one or more electronic files that specify configuration parameters of the distributed computing application and/or of any suitable microservices that are downstream of the distributed computing application. In various aspects, the computerized tool can build a dependency graph by parsing such one or more configuration files, where the dependency graph can indicate a chain/tree of microservices on which the distributed computing application depends. In various cases, the dependency graph can be considered as indicating the current structure of the distributed computing application. In various instances, the computerized tool can perform a compliance check based on the dependency graph. If the configuration parameters of the distributed computing application fail to satisfy the compliance standards, or if the configuration parameters of any of the downstream microservices fail to satisfy the compliance standards, the distributed computing application can be considered as ultimately non-compliant. On the other hand, if the configuration parameters of the distributed computing application satisfy the compliance standards and if the configuration parameters of all the downstream microservices satisfy the compliance standards, the distributed computing application can be considered as ultimately compliant.

Such a computerized tool can determine the compliance status of the distributed computing application prior to runtime and/or deployment of the distributed computing application (e.g., without requiring the distributed computing application to be executed or deployed). Furthermore, such a computerized tool can determine the compliance status of the distributed computing application without requiring any predetermined structural template (e.g., without having to leverage a predetermined distributed structure that is known a priori to be compliant).

Such a computerized tool can, in various aspects, comprise a receiver component, a dependency component, a compliance component, and/or a transmitter component.

In various embodiments, there can be a computing application that exhibits a distributed architecture. That is, the executable script of the computing application can call/invoke any suitable number of computing objects that are external to the executable script of the computing application, and each such computing object can call/invoke any suitable number of other computing objects. As used herein, a computing object can be any suitable combination of computer-executable hardware and/or computer-executable software.

In various cases, the receiver component of the computerized tool can electronically receive and/or otherwise electronically access one or more declarative deployment manifests that are associated with the computing application and/or that are associated with the computing objects that are downstream of the computing application. In various cases, a declarative deployment manifest that corresponds to a given computing object can be any suitable electronic file that specifies configuration parameters that define the given computing object and/or that specifies dependencies of the given computing object. For instance, the declarative deployment manifest can specify an identifier, a version number, a communication protocol, an encryption/decryption protocol, and/or any other suitable characteristics, attributes, and/or properties of the given computing object. Moreover, the declarative deployment manifest can specify on which other computing objects the particular computing object depends. That is, the declarative deployment manifest can identify which other computing objects are called, invoked, downloaded, and/or otherwise relied upon by the particular computing object. In various cases, the receiver component can electronically retrieve the one or more declarative deployment manifests from any suitable centralized and/or decentralized data structure (e.g., graph data structure, relational data structure, hybrid data structure), whether remote from and/or local to the receiver component. Accordingly, other components of the computerized tool described herein can electronically interact with and/or otherwise can electronically access the one or more declarative deployment manifests.

In various embodiments, the dependency component of the computerized tool can electronically construct a dependency topology of the computing application based on the one or more declarative deployment manifests. More specifically, the dependency component can electronically parse the one or more declarative deployment manifests, thereby identifying one or more computing objects on which the computing application depends.

In various cases, the computing application can be considered as depending directly on a given computing object if the executable script of the computing application calls and/or invokes the given computing object. For example, if a computing application S calls a microservice T, the computing application S can be considered as depending directly on the microservice T. On the other hand, in various cases, the computing application can be considered as depending indirectly on a given computing object if the computing application and the given computing object are separated by at least one intervening computing object. For example, suppose that the computing application S calls the microservice T, which calls a microservice U. In such case, the computing application S can be considered as depending indirectly on the microservice U and/or as depending directly on the microservice T. Moreover, the microservice T can be considered as depending directly upon the microservice U. In various cases, the microservice T can be considered as an intervening computing object that is between the computing application S and the microservice U.

In various instances, the dependency component can build the dependency topology based on the identified one or more computing objects on which the computing application depends. Specifically, the dependency topology can be a graph structure. In various cases, the dependency component can insert into the graph structure a first node to represent the computing application, and/or the dependency component can insert into the graph structure one or more other nodes to represent the one or more computing objects on which the computing application depends. In various instances, the dependency component can insert edges into the graph structure, where an edge between two nodes in the graph structure can indicate that one of the two nodes calls/invokes the other of the two nodes. In some cases, the edge can be directional, such that the node away from which the edge points can, for example, be considered as depending upon the node to which the edge points. In various cases, because the one or more declarative deployment manifests can specify configuration parameters of the computing application, the dependency component can assign the configuration parameters of the computing application to the first node in the dependency topology. Furthermore, because the one or more declarative deployment manifests can specify configuration parameters of the one or more computing objects on which the computing application depends, the dependency component can respectively assign the configuration parameters of the one or more computing objects to the one or more other nodes in the dependency topology.

In various embodiments, the compliance component of the computerized tool can electronically determine a compliance status of the computing application, by analyzing the dependency topology. More specifically, the compliance component can electronically store, maintain, and/or otherwise have access to one or more compliance standards that apply to the computing application and/or to the one or more computing objects. In various aspects, the compliance component can electronically iterate through each node in the dependency topology, beginning with the first node that represents the computing application. For each node, the compliance component can compare the configuration parameters assigned to that node with any of the one or more compliance standards that apply to that node. Based on such comparison, the compliance component can determine whether the node is individually compliant. In other words, the configuration parameters assigned to that node can be considered as indicating current properties, attributes, and/or characteristics of that node, while the one or more compliance standards that apply to that node can be considered as indicating required and/or acceptable properties, attributes, and/or characteristics for that node.

Furthermore, for each given node, the compliance component can identify another node on which the given node depends, and the compliance component can compare the configuration parameters assigned to the given node with the configuration parameters assigned to the other node. Based on such comparison, the compliance component can determine whether communication between the given node and the other node is compliant. For example, suppose that the given node implements a particular communication protocol that independently complies with the one or more compliance standards, and suppose that the other node implements a different communication protocol that also independently complies with the one or more compliance standards. In such case, if the particular communication protocol implemented by the given node is incompatible with the different communication protocol implemented by the other node, the compliance component can determine that communication between the given node and the other node is not compliant.

In various instances, the compliance component can electronically generate and/or output a compliance report that summarizes and/or indicates the node-by-node findings of the above comparisons. In various cases, if the compliance component determines that each node individually satisfies the one or more compliance standards, and if the compliance component determines that the configuration parameters of each given node are consistent/compatible with configuration parameters of nodes on which the given node depends, the compliance component can conclude that the computing application is ultimately compliant. Otherwise, the compliance component can conclude that the computing application is not ultimately compliant.

In various embodiments, the transmitter component of the computerized tool can electronically transmit and/or relay the compliance report to any suitable computing device that is associated with a developer and/or operator of the computing application.

As a specific non-limiting example, the computerized tool can, in various aspects, be implemented in a KUBERNETES® software environment. KUBERNETES is a registered trademark of the Linux Foundation. KUBERNETES is an open-source system for automating deployment, scaling, and/or management of containerized computing applications.

In various aspects, a software repository (e.g., a git repository) can electronically store and/or maintain the deployment manifests (and/or executable scripts) of any suitable number of KUBERNETES-implemented computing applications and/or of any suitable number of KUBERNETES objects. As mentioned above, a deployment manifest of a given computing application can specify any suitable configuration parameters of the given computing application and/or any dependencies of the given computing application. In various instances, a software developer can upload to the software repository a new version of a deployment manifest that corresponds to a particular KUBERNETES-implemented computing application. In various aspects, the computerized tool can automatically perform a compliance check on the particular KUBERNETES-implemented computing application, as described herein.

In various cases, the receiver component of the computerized tool can electronically retrieve from the software repository the deployment manifest that corresponds to the particular KUBERNETES-implemented computing application. In various aspects, the dependency component of the computerized tool can electronically parse the deployment manifest, thereby identifying a first set of KUBERNETES objects on which the particular KUBERNETES-implemented computing application depends. Such KUBERNETES objects can, as a non-limiting example, include KUBERNETES ingresses, KUBERNETES services that are load-balanced by a KUBERNETES ingress, KUBERNETES deployments that are exposed by a KUBERNETES service, KUBERNETES pods that are managed by a KUBERNETES deployment, KUBERNETES containers that are executed by a KUBERNETES pod, Docker images that are implemented/summoned by a KUBERNETES container, and/or software packages that are specified by a Docker image.

In various cases, the receiver component of the computerized tool can electronically retrieve from the software repository other deployment manifests that respectively correspond to the first set of KUBERNETES objects. Such other deployment manifests can respectively specify the configuration parameters and/or dependencies of the first set of KUBERNETES objects. Accordingly, the dependency component can electronically parse each of the other deployment manifests, thereby identifying a second set of KUBERNETES objects on which the first set of KUBERNETES objects respectively depend.

The receiver component of the computerized tool can then electronically retrieve from the software repository still other deployment manifests that respectively correspond to the second set of KUBERNETES objects. Such still other deployment manifests can respectively specify the configuration parameters and/or dependencies of the second set of KUBERNETES objects. Accordingly, the dependency component can electronically parse each of the still other deployment manifests, thereby identifying a third set of KUBERNETES objects on which the second set of KUBERNETES objects respectively depend.

The receiver component and the dependency component can, in various non-limiting examples, repeat this process until the dependency component identifies a set of KUBERNETES objects that do not depend on any other KUBERNETES objects.

In various cases, the dependency component can electronically construct a dependency graph based on all the identified KUBERNETES objects. More specifically, the dependency component can insert a first node into the graph to represent the particular KUBERNETES-implemented computing application. Moreover, for each KUBERNETES object identified by the dependency component, the dependency component can insert another node into the graph to represent such KUBERNETES object. Furthermore, the dependency component can insert an edge between any pair of nodes to represent a direct dependency relationship between the KUBERNETES objects represented by that pair of nodes. Further still, for each node in the dependency graph, the dependency component can tag the node with the configuration parameters that are specified by the deployment manifest that corresponds to the KUBERNETES object represented by that node.

In various cases, the dependency graph can thus be considered as indicating and/or showing the distributed structure of the particular KUBERNETES-implemented computing application (e.g., showing which KUBERNETES objects depend upon and/or otherwise communicate with which other KUBERNETES objects, so as to facilitate the functionality of the particular KUBERNETES-implemented computing application).

In various aspects, the compliance component of the computerized tool can electronically perform a compliance check on the particular KUBERNETES-implemented computing application, based on the dependency graph. More specifically, for each node in the dependency graph, the compliance component can check whether the configuration parameters assigned to that node satisfy any suitable compliance standards (e.g., Center for Internet Security benchmarks) that are applicable to the KUBERNETES object represented by that node.

Moreover, for each given node in the dependency graph, the compliance component can check whether the configuration parameters assigned to the given node are compatible with the configuration parameters of another node which is coupled to the given node by a directed edge pointing away from the given node (e.g., the given node can depend directly upon the other node). In other words, the compliance component can determine whether an electronic communication channel between the given node and the other node is compliant. For example, suppose that the configuration parameters of the given node indicate that the KUBERNETES object represented by the given node implements a particular communication initiation protocol, and suppose that the configuration parameters of the other node indicate that the KUBERNETES object represented by the other node implements a particular communication reception protocol. If the particular communication initiation protocol is compatible with the particular communication reception protocol, the compliance component can conclude that the communication channel between the two nodes is compliant. On the other hand, if the particular communication initiation protocol is not compatible with the particular communication reception protocol, the compliance component can conclude that the communication channel between the two nodes is not compliant.

If each node and each communication channel indicated by the dependency topology is compliant, the compliance component can conclude that the particular KUBERNETES-implemented computing application is ultimately compliant. However, if at least one node or at least one communication channel indicated by the dependency topology is not compliant, the compliance component can conclude that the particular KUBERNETES-implemented computing application is ultimately not compliant.

In various cases, the compliance component can electronically generate a compliance report summarizing its conclusions, and the transmitter component of the computerized tool can electronically transmit the compliance report to any suitable computing device (e.g., so as to notify the developer of results of the compliance check).

In other words, when it is desired to perform a compliance check on a KUBERNETES-implemented computing application, the computerized tool can: identify, in one or more software repositories, the deployment manifests that relate to the KUBERNETES-implemented computing application; identify one or more KUBERNETES objects declared (e.g., specified as dependencies) in the deployment manifests; discover server endpoints and/or client endpoints of the identified KUBERNETES objects; and construct a topology that indicates/shows the interactions and/or dependencies among the identified KUBERNETES objects. In various aspects, the computerized tool can identify server endpoints of the identified KUBERNETES objects by: determining which of the identified KUBERNETES objects are services and/or ingresses, as opposed to deployments, pods, containers, Docker images, and/or packages (e.g., this can be specified by deployment manifests of the KUBERNETES objects); matching, via label selectors, the determined services and/or ingresses to the underlying KUBERNETES objects that they expose; and/or identifying, for each service and/or ingress, other KUBERNETES objects which are required to configure the service/ingress and/or which are required to implement the service/ingress (e.g., again, can be specified by the deployment manifests of the KUBERNETES objects). In various instances, the computerized tool can identify client endpoints by: identifying any Docker images summoned by the identified KUBERNETES objects (e.g., can be specified in the deployment manifests of the KUBERNETES objects); discovering software packages installed in each identified Docker image (e.g., can be specified in manifests of the Docker images and/or can be identified by parsing the Docker images); determining which of the software packages are clients/drivers that connect to external services (e.g., can be specified in manifests of the software packages); and identifying, for each client/driver, KUBERNETES objects which are invoked by the client/driver and/or which are used to configure the client/driver (e.g., again, can be specified in manifests of the client/drivers).

Although the above example describes how embodiments of the invention can be applied in a KUBERNETES setting, this is a mere non-limiting example. In various aspects, embodiments of the invention can be applied in any other suitable computing setting (e.g., OpenSource setting, non-containerized settings).

In any case, various embodiments of the invention can construct a dependency topology that illustrates a distributed structure of a computing application, by parsing declarative deployment manifests associated with the computing application. By iterating through the constructed dependency topology, various embodiments of the invention can perform a compliance check on the computing application. Furthermore, such a compliance check can be facilitated without executing and/or running the computing application (e.g., at a development stage of the computing application, prior to deployment of the computing application). Further still, such a compliance check can be facilitated without requiring any pre-existing distributed structure that is already known to be compliant.

Various embodiments of the invention can be employed to use hardware and/or software to solve problems that are highly technical in nature (e.g., to facilitate compliance enforcement via service discovery analytics), that are not abstract and that cannot be performed as a set of mental acts by a human. Further, some of the processes performed can be performed by a specialized computer (e.g., file parsers, graph builders). In various aspects, some defined tasks associated with various embodiments of the invention can include: accessing, by a device operatively coupled to a processor, one or more declarative deployment manifests associated with a computing application; building, by the device, a dependency topology based on the one or more declarative deployment manifests, wherein the dependency topology indicates dependencies among one or more computing objects that are declared by the one or more declarative deployment manifests; and determining, by the device and based on the dependency topology, whether the computing application satisfies one or more compliance standards.

Moreover, neither the human mind nor a human with pen and paper can electronically access declarative deployment manifests, electronically construct a dependency topology by electronically parsing the declarative deployment manifests, and/or electronically perform a compliance check by iterating through the dependency topology. Instead, various embodiments of the invention are inherently and inextricably tied to computer technology and cannot be implemented outside of a computing environment. For instance, a computing application is an inherently computerized device that cannot exist outside of a computing environment. Likewise, a computerized tool that can electronically analyze declarative deployment manifests that define the computing application, electronically construct a dependency graph based on the declarative deployment manifests, and/or electronically perform a compliance check by analyzing the dependency topology is also an inherently computerized device that cannot be practicably implemented in any sensible way without computers.

In various instances, one or more embodiments of the compliance enforcement via service discovery analytics can be integrated into a practical application. Indeed, as described herein, various embodiments of the invention, which can take the form of systems and/or computer-implemented methods, can be considered as a computerized tool that can electronically analyze configuration files that correspond to a distributed computing application, that can electronically build a dependency topology based on the configuration files, and/or that can electronically perform a compliance check based on the dependency topology. Such a computerized tool can determine whether the distributed computing application is ultimately compliant with one or more compliance standards, without having to execute the distributed computing application and/or without having access to a predetermined dependency topology that is known a priori to be ultimately compliant.

In stark contrast and as mentioned above, various conventional techniques facilitate compliance checks by analyzing process logs that are generated through actual execution of the distributed computing application, while various other conventional techniques facilitate compliance checks by analyzing predetermined dependency topologies that are already known to be compliant. As explained above, the costs associated with curing compliance issues can be reduced by detecting the compliance issues as early as possible. Because the computerized tool described herein can detect compliance issues without having to execute and/or deploy the distributed computing application (e.g., without having to wait until the distributed computing application is complete enough so as to be executable/deployable), the computerized tool can provide a concrete and tangible benefit over various conventional techniques. Additionally, as explained above, it might not always be practicable to have a predetermined dependency topology that is already known to be compliant and with which a distributed computing application can be compared. Because the computerized tool described herein can detect compliance issues without relying on any predetermined dependency topology that is known a priori to be compliant, the computerized tool can provide a concrete and tangible benefit over various conventional techniques. At the very least, by automatically facilitating compliance checks of distributed computing applications, such a computerized tool certainly constitutes a useful and practical application of computers.

It should be appreciated that the figures and the herein disclosure describe non-limiting examples of various embodiments of the invention.

FIG. 1 illustrates a block diagram of an example, non-limiting system 100 that can facilitate compliance enforcement via service discovery analytics in accordance with one or more embodiments described herein. As shown, a distributed compliance system 102 can be electronically integrated, via any suitable wired and/or wireless electronic connections, with a computing application 104, a set of declarative deployment manifests 106, and/or a developer computing device 120.

In various aspects, the computing application 104 can be any suitable computer-executable software program that exhibits a distributed architecture. In other words, the computing application 104 can facilitate its functionality by calling, invoking, downloading, installing, and/or otherwise relying upon one or more computing objects that are external to the computing application 104.

In various cases, a computing object can be any suitable computer software that performs and/or otherwise facilitates a discrete functionality. For example, a computing object can be a microservice that performs any suitable data computations, data manipulations, data renditions, and/or data queries (e.g., a KUBERNETES container can execute a software program, so as to compute, manipulate, render, and/or query data). As another example, a computing object can schedule, coordinate, and/or manage one or more other computing objects (e.g., a KUBERNETES pod can manage one or more KUBERNETES containers, and/or a KUBERNETES deployment can manage one or more KUBERNETES pods). As yet another example, a given computing object can expose one or more other computing objects to external clients, such that the given computing object routes and/or load-balances traffic from the external clients to the one or more other computing objects (e.g., a KUBERNETES service can expose one or more KUBERNETES deployments to external client traffic via label selectors). As still another example, in some cases, a given computing object can be read by and/or executed by another computing object (e.g., a Docker image can represent a version of a computer program that is run and/or executed by a KUBERNETES container). As a further example, a given computing object can be downloaded and/or installed by another computing object (e.g., installation and/or download of a software package can be required and/or specified by a Docker image). These are mere non-limiting examples. In various cases, a computing object can be any suitable computer software that serves some purpose and/or facilitates some function, and that can be called, invoked, read, installed, downloaded, and/or otherwise relied upon by the computing application 104 and/or by another computing object.

In various cases, the computing application 104 can depend upon a computing object in a direct fashion and/or in an indirect fashion. For example, if the executable script of the computing application 104 includes a command that calls/invokes a given computing object, the computing application 104 can be considered as depending directly on the given computing object. In such case, there can be no intervening computing objects between the computing application 104 and the given computing object. On the other hand, if the executable script of the computing application 104 includes a command that calls/invokes a first computing object, and if the executable script of the first computing object includes a command that calls/invokes a second computing object, the computing application 104 can be considered as depending indirectly on the second computing object. In such case, the first computing object can be considered as intervening between the computing application 104 and the second computing object.

In various aspects, the computing application 104, and/or any computing objects on which the computing application 104 depends, can correspond to and/or otherwise be associated with a set of declarative deployment manifests 106. In various cases, the set of declarative deployment manifests 106 can include any suitable number of declarative deployment manifests. For example, if the computing application 104 depends on n computing objects, for any suitable positive integer n, then the set of declarative deployment manifests 106 can include n+1 declarative deployment manifests (e.g., one declarative deployment manifest corresponding to the computing application 104 and n declarative deployment manifests respectively corresponding to the n computing objects).

In various instances, a declarative deployment manifest that corresponds to the computing application 104 can be any suitable electronic file that specifies, indicates, identifies, and/or otherwise declares one or more configuration parameters that define the computing application 104. For example, the declarative deployment manifest corresponding to the computing application 104 can indicate an identifier (e.g., a name) of the computing application 104, a version number of the computing application 104, a communication initiation protocol implemented by the computing application 104, a communication reception protocol implemented by the computing application 104, an encryption protocol implemented by the computing application 104, a decryption protocol implemented by the computing application 104, and/or any other suitable characteristics, attributes, and/or properties of the computing application 104. Moreover, in various cases, the declarative deployment manifest that corresponds to the computing application 104 can specify, indicate, identify, and/or otherwise declare one or more dependencies of the computing application 104. That is, the declarative deployment manifest can specify one or more computing objects on which the computing application 104 directly (and/or, in some cases, indirectly) depends.

Likewise, in various aspects, a declarative deployment manifest that corresponds to a particular computing object can be any suitable electronic file that specifies, indicates, identifies, and/or otherwise declares one or more configuration parameters (e.g., identifier, version number, communication initiation protocol, communication reception protocol, encryption protocol, decryption protocol, and/or any other suitable characteristics, attributes, and/or properties) that define the particular computing object. Moreover, in various cases, the declarative deployment manifest that corresponds to the particular computing object can specify, indicate, identify, and/or otherwise declare one or more dependencies of the particular computing object.

In various cases, it can be desired to perform a compliance check on the computing application 104. As explained herein, the distributed compliance system 102 can facilitate such a compliance check by leveraging the set of declarative deployment manifests 106. Moreover, as described herein, the distributed compliance system 102 can facilitate such a compliance check without having to execute and/or deploy the computing application 104 and/or without having to rely upon a predetermined architecture that is known to be compliant.

In various embodiments, the distributed compliance system 102 can comprise a processor 108 (e.g., computer processing unit, microprocessor) and a computer-readable memory 110 that is operably connected to the processor 108. The memory 110 can store computer-executable instructions which, upon execution by the processor 108, can cause the processor 108 and/or other components of the distributed compliance system 102 (e.g., receiver component 112, dependency component 114, compliance component 116, and/or transmitter component 118) to perform one or more acts. In various embodiments, the memory 110 can store computer-executable components (e.g., receiver component 112, dependency component 114, compliance component 116, and/or transmitter component 118), and the processor 108 can execute the computer-executable components.

In various embodiments, the distributed compliance system 102 can comprise a receiver component 112. In various aspects, the receiver component 112 can electronically retrieve and/or otherwise electronically access the computing application 104 and/or the set of declarative deployment manifests 106 from any suitable centralized and/or decentralized data structure (not shown), whether remote from and/or local to the receiver component 112. Accordingly, in various instances, other components of the distributed compliance system 102 can manipulate and/or otherwise interact with the computing application 104 and/or the declarative deployment manifests 106.

In various embodiments, the distributed compliance system 102 can comprise a dependency component 114. In various aspects, the dependency component 114 can electronically construct a dependency topology based on the set of declarative deployment manifests 106, where the dependency topology can indicate dependencies among a plurality of computing objects that are declared by the set of declarative deployment manifests 106. In other words, the dependency topology can be considered as illustrating and/or characterizing the distributed architecture of the computing application 104. In still other words, the dependency topology can be considered as indicating which computing objects are downstream of the computing application 104.

More specifically, the dependency component 114 can create an initially empty graph structure. In various instances, the dependency component 114 can electronically parse, via any suitable text parsing technique, the set of declarative deployment manifests 106. Because the set of declarative deployment manifests 106 can collectively specify and/or declare the computing objects on which the computing application 104 depends, such parsing can allow the dependency component 114 to identify those computing objects. In various cases, the dependency component 114 can insert into the graph structure a first node that represents the computing application 104, and/or can assign to the first node the configuration parameters that are specified in the declarative deployment manifest that corresponds to the computing application 104. Similarly, in various instances, the dependency component 114 can insert into the graph structure one or more other nodes that respectively represent the computing objects on which the computing application 104 depends, and/or can respectively assign to the one or more other nodes the configuration parameters that are specified in the declarative deployment manifests that correspond to those computing objects. For example, if the computing application 104 depends on n computing objects for any suitable positive integer n, the dependency component 114 can insert n+1 nodes into the graph structure (e.g., one node tagged with the configuration parameters of the computing application 104, and n nodes respectively tagged with configuration parameters of the n computing objects). Moreover, the dependency component 114 can insert into the graph edges between any suitable pair of nodes, where an edge between two nodes can indicate that one of the two nodes depends directly upon the other of the two nodes. In some instances, the edges can be directional to indicate a direction of dependency. For example, if an edge points away from a first node and toward a second node, this can indicate that the first node depends directly on the second node (e.g., the first node is configured to call/invoke the second node). Such a graph structure can be considered as the dependency topology.

In various embodiments, the distributed compliance system 102 can comprise a compliance component 116. In various aspects, the compliance component 116 can electronically determine a compliance status of the computing application 104, based on the dependency topology generated by the dependency component 114. Specifically, in various cases, the compliance component 116 can electronically store and/or otherwise have electronic access to a set of compliance standards. In various cases, the set of compliance standards can collectively govern the configuration parameters of the computing application 104 and/or the configuration parameters of the computing objects on which the computing application 104 depends.

In various instances, the compliance component 116 can iterate through each node in the dependency topology. For each node, the compliance component 116 can electronically compare the configuration parameters assigned to that node with the set of compliance standards (e.g., with a subset of the set of compliance standards, which subset can specifically apply to the node under consideration). Based on such comparison, the compliance component 116 can label the node under consideration as either individually compliant or individually non-compliant. Furthermore, for each given node, the compliance component 116 can identify another node on which the given node directly depends, and the compliance component 116 can electronically compare the configuration parameters of the given node with the configuration parameters of the other node to determine whether the configuration parameters are compatible and/or consistent. Based on such comparison, the compliance component 116 can determine whether electronic communication can properly/compliantly be facilitated between the two nodes.

If the compliance component 116 determines that all nodes in the dependency topology are individually compliant, and if the compliance component 116 determines that electronic communication can be properly/compliantly facilitated between each pair of connected nodes in the dependency topology, the compliance component 116 can conclude that the computing application 104 is ultimately compliant. On the other hand, if the compliance component 116 determines that at least one node in the dependency topology is not individually compliant, or if the compliance component 116 determines that electronic communication cannot be properly/compliantly facilitated between at least one pair of connected nodes in the dependency topology, the compliance component 116 can conclude that the computing application 104 is ultimately non-compliant.

In various embodiments, the distributed compliance system 102 can comprise a transmitter component 118. In various aspects, the transmitter component 118 can electronically transmit results generated by the compliance component 116 to the developer computing device 120, where the developer computing device 120 can be any suitable computing device (e.g., any suitable combination of computer-executable hardware and/or computer-executable software) that is associated with a developer and/or operator of the computing application 104. In other words, the transmitter component 118 can provide notice of the compliance check results generated by the compliance component 116 to the developer computing device 120.

Figure 2:
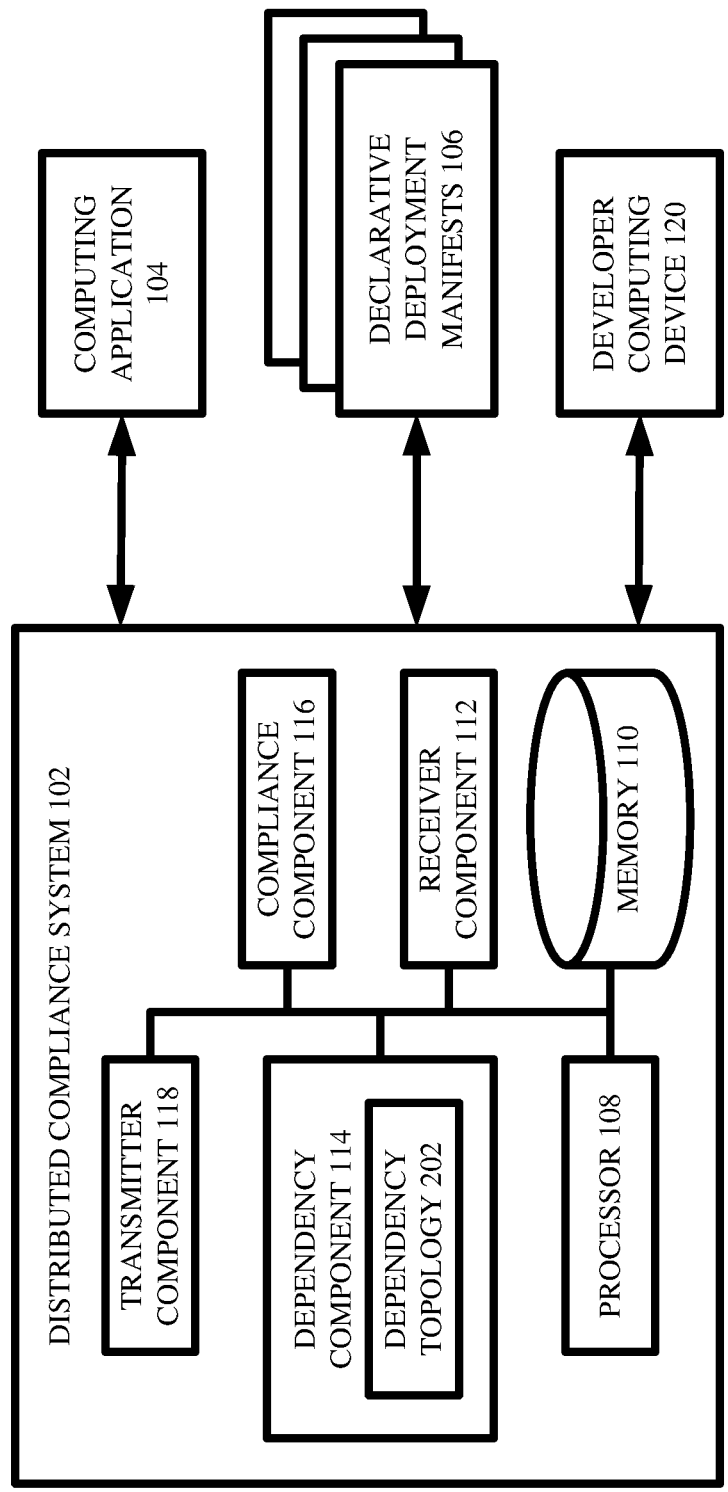
FIG. 2 illustrates a block diagram of an example, non-limiting system including a dependency topology that facilitates compliance enforcement via service discovery analytics in accordance with one or more embodiments described herein.

FIG. 2 illustrates a block diagram of an example, non-limiting system 200 including a dependency topology that can facilitate compliance enforcement via service discovery analytics in accordance with one or more embodiments described herein. As shown, the system 200 can, in some cases, comprise the same components as the system 100, and can further comprise a dependency topology 202.

In various embodiments, the dependency component 114 can electronically build, construct, and/or otherwise generate the dependency topology 202, based on the set of declarative deployment manifests 106. As mentioned above, in various aspects, the set of declarative deployment manifests 106 can include a first declarative deployment manifest that corresponds to the computing application 104 (e.g., that specifies/declares the configuration parameters and/or the dependencies of the computing application 104) and/or can include one or more other declarative deployment manifests that respectively correspond to the computing objects on which the computing application 104 depends. In various instances, the dependency component 114 can electronically parse the set of declarative deployment manifests 106, thereby identifying the configuration parameters of the computing application 104, the computing objects on which the computing application 104 depends, and/or the configuration parameters of those computing objects.

In various cases, the dependency component 114 can initialize the dependency topology 202 as an empty graph. In various aspects, the dependency component 114 can add to the dependency topology 202 (e.g., can insert into the graph) a first node, where the first node can represent the computing application 104. In various cases, the dependency component 114 can assign to the first node the configuration parameters that define the computing application 104, which configuration parameters can be declared by the set of declarative deployment manifests 106. Moreover, in various aspects, the dependency component 114 can add to the dependency topology 202 (e.g., can insert into the graph) one or more other nodes, where the one or more other nodes can respectively represent the computing objects on which the computing application 104 depends. In various cases, the dependency component 114 can respectively assign to the one or more other nodes the configuration parameters that define the computing objects, which configuration parameters can be declared by the set of declarative deployment manifests 106. Furthermore, in various instances, the dependency component 114 can add to the dependency topology 202 (e.g., can insert into the graph) one or more edges between pairs of nodes, where an edge can indicate that one node in the dependency topology 202 directly depends upon another node in the dependency topology 202. In various aspects, the edges in the dependency topology 202 can be directional so as to convey a direction of dependency. For example, an edge that points away from a given node and toward another node can be interpreted to mean that the given node directly depends upon (e.g., is configured to call and/or invoke) the other node.

In other words, the dependency component 114 can electronically build the dependency topology 202, based on information parsed from the declarative deployment manifests 106. A non-limiting example of this is presented with respect to FIGS. 3-4.

Figure 3:
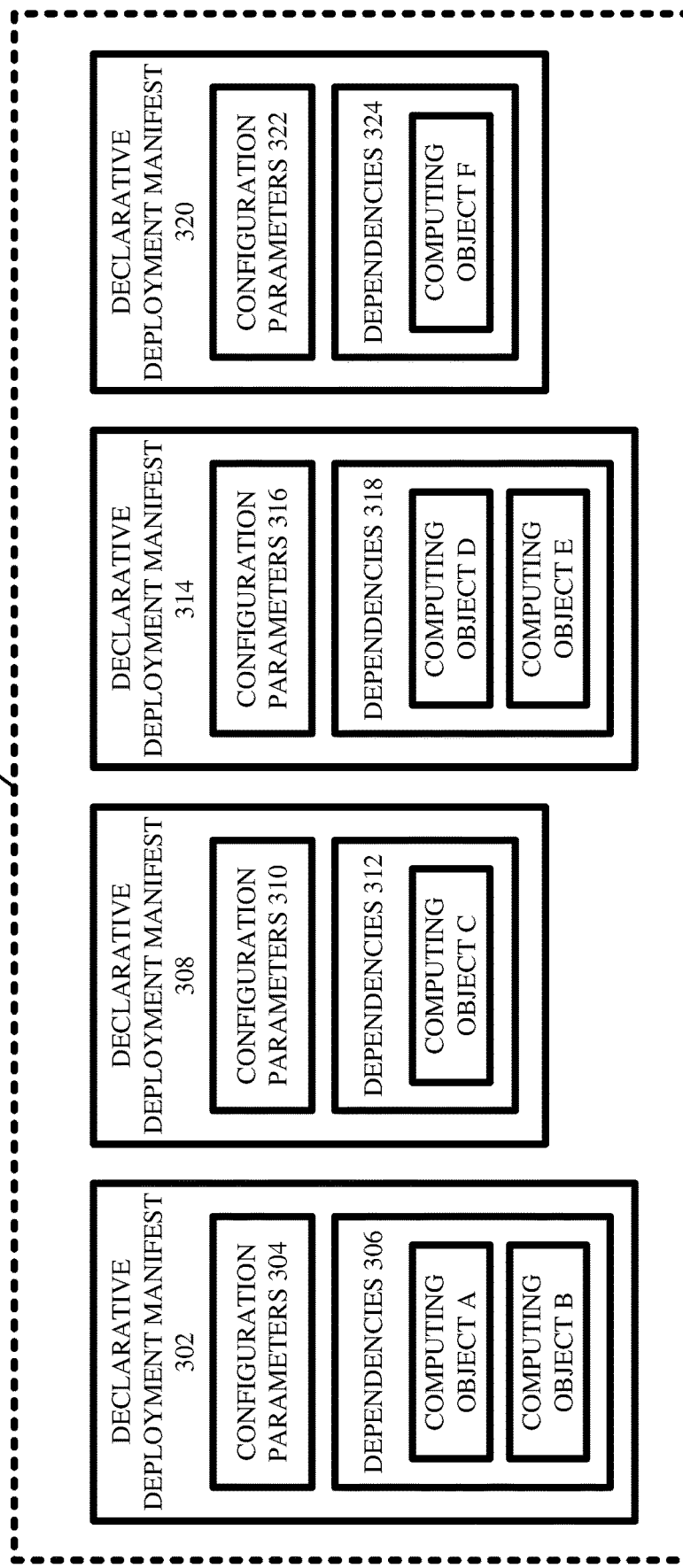
FIGS. 3-4 illustrate example and non-limiting block diagrams showing how declarative deployment manifests can be leveraged to construct a dependency topology in accordance with one or more embodiments described herein.
Figure 4:
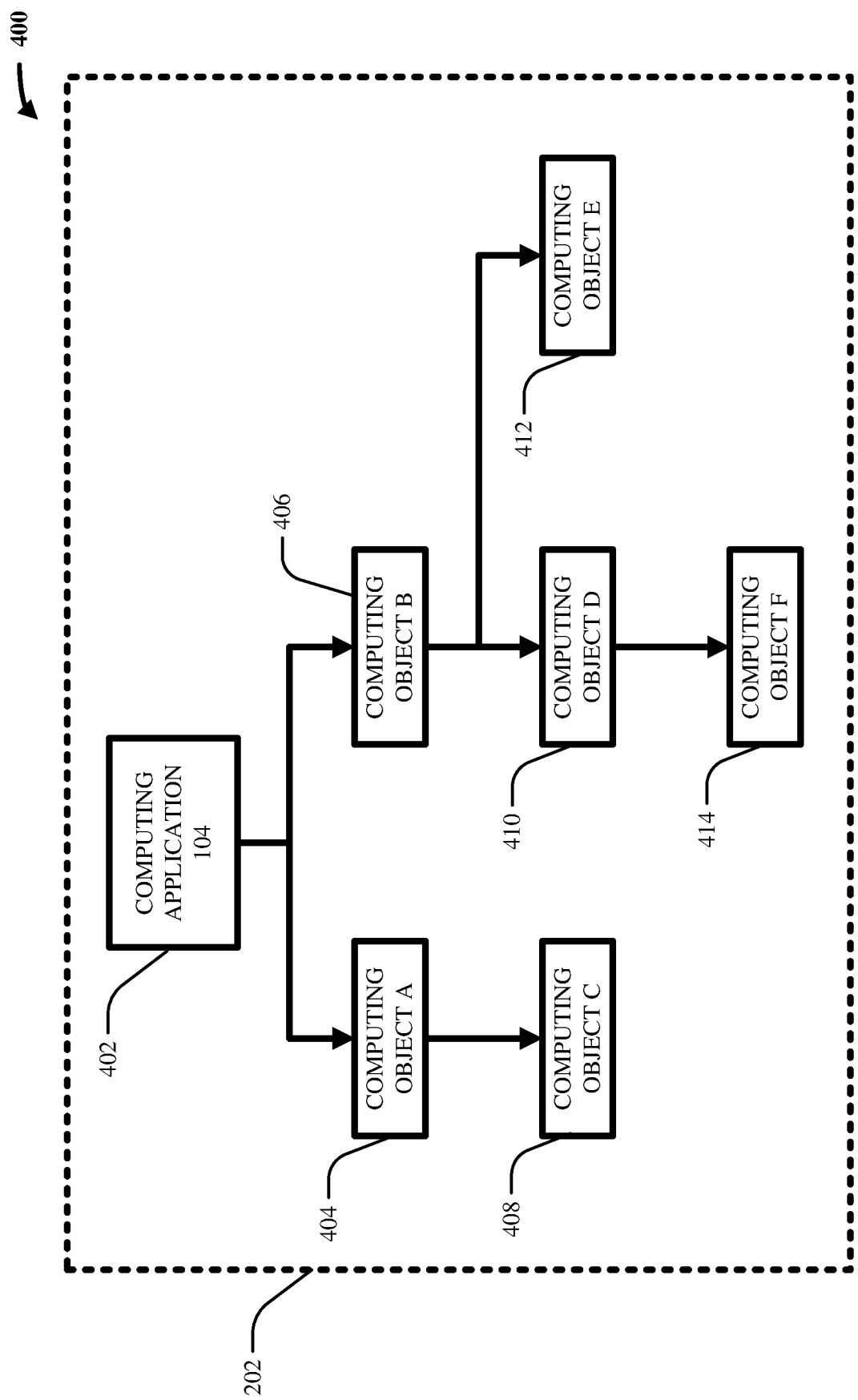

FIGS. 3-4 illustrate example and non-limiting block diagrams showing how declarative deployment manifests can be leveraged to construct a dependency topology in accordance with one or more embodiments described herein.

First, consider FIG. 3. As shown, FIG. 3 illustrates a non-limiting example of the set of declarative deployment manifests 106. In the non-limiting example shown, the set of declarative deployment manifests 106 can include four declarative deployment manifests: a declarative deployment manifest 302, a declarative deployment manifest 308, a declarative deployment manifest 314, and/or a declarative deployment manifest 320. However, this is a mere non-limiting example. In various embodiments, the set of declarative deployment manifests 106 can include any suitable number of declarative deployment manifests.

In various instances, the declarative deployment manifest 302 can correspond to the computing application 104. As shown, the declarative deployment manifest 302 can specify/declare configuration parameters 304 and/or dependencies 306. Because the declarative deployment manifest 302 can correspond to the computing application 104, the configuration parameters 304 can indicate any suitable properties, characteristics, and/or attributes of the computing application 104 (e.g., can indicate an identifier of the computing application 104, a version number of the computing application 104, a communication protocol utilized by the computing application 104, a security protocol utilized by the computing application 104, a data querying protocol utilized by the computing application 104, a type of input data receivable by the computing application 104, a type of output data generatable by the computing application 104). Moreover, because the declarative deployment manifest 302 can correspond to the computing application 104, the dependencies 306 can indicate one or more computing objects on which the computing application 104 directly depends (e.g., computing objects which the computing application 104 is configured to call, invoke, download, install, and/or otherwise rely on). In the non-limiting example shown, the dependencies 306 can include an indication of a computing object A and an indication of a computing object B. Accordingly, this can mean that the computing application 104 directly depends on (e.g., calls, invokes, downloads, installs, and/or relies on) the computing object A and the computing object B.

In various aspects, the declarative deployment manifest 308 can correspond to the computing object A. As shown, the declarative deployment manifest 308 can specify/declare configuration parameters 310 and/or dependencies 312. Because the declarative deployment manifest 308 can correspond to the computing object A, the configuration parameters 310 can indicate any suitable properties, characteristics, and/or attributes of the computing object A. Moreover, because the declarative deployment manifest 308 can correspond to the computing object A, the dependencies 312 can indicate one or more computing objects on which the computing object A directly depends. In the non-limiting example shown, the dependencies 312 can include an indication of a computing object C. Accordingly, this can mean that the computing object A directly depends on the computing object C.

Although not shown in FIG. 3, a declarative deployment manifest in the set of declarative deployment manifests 106 can correspond to the computing object C, and such declarative deployment manifest can specify/declare configuration parameters of the computing object C and/or can, in various cases, indicate that the computing object C lacks dependencies. In other words, the computing object C can, in this non-limiting example, be considered as a fully self-contained computing object that does not call, invoke, download, install, and/or otherwise rely upon another computing object.

In various cases, the declarative deployment manifest 314 can correspond to the computing object B. As shown, the declarative deployment manifest 314 can specify/declare configuration parameters 316 and/or dependencies 318. Because the declarative deployment manifest 314 can correspond to the computing object B, the configuration parameters 316 can indicate any suitable properties, characteristics, and/or attributes of the computing object B. Moreover, because the declarative deployment manifest 314 can correspond to the computing object B, the dependencies 318 can indicate one or more computing objects on which the computing object B directly depends. In the non-limiting example shown, the dependencies 318 can include an indication of a computing object D and an indication of a computing object E. Accordingly, this can mean that the computing object B directly depends on the computing object D and the computing object E.

In various aspects, the declarative deployment manifest 320 can correspond to the computing object D. As shown, the declarative deployment manifest 320 can specify/declare configuration parameters 322 and/or dependencies 324. Because the declarative deployment manifest 320 can correspond to the computing object D, the configuration parameters 322 can indicate any suitable properties, characteristics, and/or attributes of the computing object D. Moreover, because the declarative deployment manifest 320 can correspond to the computing object D, the dependencies 324 can indicate one or more computing objects on which the computing object D directly depends. In the non-limiting example shown, the dependencies 324 can include an indication of a computing object F. Accordingly, this can mean that the computing object D directly depends on the computing object F.

Although not shown in FIG. 3, a declarative deployment manifest in the set of declarative deployment manifests 106 can correspond to the computing object E, and such declarative deployment manifest can specify/declare configuration parameters of the computing object E, and/or can, in various cases, indicate that the computing object E lacks dependencies. In other words, the computing object E can, in this non-limiting example, be considered as a fully self-contained computing object that does not call, invoke, download, install, and/or otherwise rely upon another computing object.

Similarly, although not shown in FIG. 3, a declarative deployment manifest in the set of declarative deployment manifests 106 can correspond to the computing object F, and such declarative deployment manifest can specify/declare configuration parameters of the computing object F, and/or can, in various cases, indicate that the computing object F lacks dependencies. In other words, the computing object F can, in this non-limiting example, be considered as a fully self-contained computing object that does not call, invoke, download, install, and/or otherwise rely upon another computing object.

Next, consider FIG. 4. As shown, FIG. 4 illustrates a non-limiting example of the dependency topology 202 that can be constructed by the dependency component 114, based on the non-limiting example of the set of declarative deployment manifests 106 shown in FIG. 3.

In various instances, the dependency component 114 can textually parse the declarative deployment manifest 302, thereby discovering that the computing application 104 depends upon the computing object A and the computing object B. Moreover, in various cases, the dependency component 114 can textually parse the declarative deployment manifest 308, thereby discovering that the computing object A depends upon the computing object C. Furthermore, in various instances, the dependency component 114 can textually parse the declarative deployment manifest 314, thereby discovering that the computing object B depends upon the computing object D and the computing object E. Further still, in various aspects, the dependency component 114 can textually parse the declarative deployment manifest 320, thereby discovering that the computing object D depends upon the computing object F.

In various instances, the dependency component 114 can create the dependency topology 202 as an initially empty graph structure. In various aspects, the dependency component 114 can insert into the dependency topology 202 a node 402 that represents the computing application 104. As mentioned above, the dependency component 114 can discover that the computing application 104 depends upon the computing object A. Accordingly, the dependency component 114 can insert into the dependency topology 202 a node 404 that represents the computing object A. Moreover, the dependency component 114 can insert a directed edge between the node 402 and the node 404, where the directed edge points away from the node 402 and toward the node 404 so as to indicate that the node 402 (e.g., the computing application 104) depends upon the node 404 (e.g., the computing object A).

As mentioned above, the dependency component 114 can discover that the computing application 104 also depends upon the computing object B. Thus, the dependency component 114 can insert into the dependency topology 202 a node 406 that represents the computing object B. Furthermore, the dependency component 114 can insert a directed edge between the node 402 and the node 406, where the directed edge points away from the node 402 and toward the node 406 so as to indicate that the node 402 (e.g., the computing application 104) depends upon the node 406 (e.g., the computing object B).

As explained above, the dependency component 114 can discover that the computing object A depends upon the computing object C. Thus, the dependency component 114 can insert into the dependency topology 202 a node 408 that represents the computing object C. Furthermore, the dependency component 114 can insert a directed edge between the node 404 and the node 408, where the directed edge points away from the node 404 and toward the node 408 so as to indicate that the node 404 (e.g., the computing object A) depends upon the node 408 (e.g., the computing object C).

As described above, the dependency component 114 can discover that the computing object B depends upon the computing object D. Thus, the dependency component 114 can insert into the dependency topology 202 a node 410 that represents the computing object D. Furthermore, the dependency component 114 can insert a directed edge between the node 406 and the node 410, where the directed edge points away from the node 406 and toward the node 410 so as to indicate that the node 406 (e.g., the computing object B) depends upon the node 410 (e.g., the computing object D).

As mentioned above, the dependency component 114 can discover that the computing object B also depends upon the computing object E. Thus, the dependency component 114 can insert into the dependency topology 202 a node 412 that represents the computing object E. Furthermore, the dependency component 114 can insert a directed edge between the node 406 and the node 412, where the directed edge points away from the node 406 and toward the node 412 so as to indicate that the node 406 (e.g., the computing object B) depends upon the node 412 (e.g., the computing object E).

As explained above, the dependency component 114 can discover that the computing object D depends upon the computing object F. Thus, the dependency component 114 can insert into the dependency topology 202 a node 414 that represents the computing object F. Furthermore, the dependency component 114 can insert a directed edge between the node 410 and the node 414, where the directed edge points away from the node 410 and toward the node 414 so as to indicate that the node 410 (e.g., the computing object D) depends upon the node 414 (e.g., the computing object F).

The result can be the non-limiting embodiment of the dependency topology 202 shown in FIG. 4. As can be seen, the dependency topology 202 of FIG. 4 indicates on which computing objects the computing application 104 depends. For example, it can be seen that the node 402 (e.g., the computing application 104) depends directly on the node 404 (e.g., the computing object A) and depends directly on the node 406 (e.g., the computing object B). This is because there is no intervening node (e.g., no intervening computing object) between the node 402 and the node 404, and/or between the node 402 and the node 406. Moreover, it can be seen that the node 402 (e.g., the computing application 104) depends indirectly upon the node 408 (e.g., the computing object C), depends indirectly upon the node 410 (e.g., the computing object D), depends indirectly upon the node 412 (e.g., the computing object E), and depends indirectly upon the node 414 (e.g., the computing object F). This is because there is at least one intervening node (e.g., at least one intervening computing object) between the node 402 and the node 408 (e.g., the node 404 intervenes), between the node 402 and the node 410 (e.g., the node 406 intervenes), between the node 402 and the node 412 (e.g., the node 406 intervenes), and between the node 402 and the node 414 (e.g., the node 406 and the node 410 both intervene). By the above reasoning, it can be seen that the node 404 depends directly on the node 408, that the node 406 depends directly on both the node 410 and the node 412, that the node 406 depends indirectly on the node 414, and that the node 410 depends directly on the node 414.

In various instances, the dependency component 114 can assign to the node 402 the configuration parameters 304 that correspond to the computing application 104. Similarly, in various aspects, the dependency component 114 can assign to the node 404 the configuration parameters 310 that correspond to the computing object A. Likewise, in various cases, the dependency component 114 can assign to the node 406 the configuration parameters 316 that correspond to the computing object B. Moreover, in various instances, the dependency component 114 can assign to the node 408 configuration parameters that correspond to the computing object C. In like fashion, the dependency component 114 can assign to the node 410 the configuration parameters 322 that correspond to the computing object D. Furthermore, in various cases, the dependency component 114 can assign to the node 412 configuration parameters that correspond to the computing object E. Finally, in various aspects, the dependency component 114 can assign to the node 414 configuration parameters that correspond to the computing object F.

Figure 5:
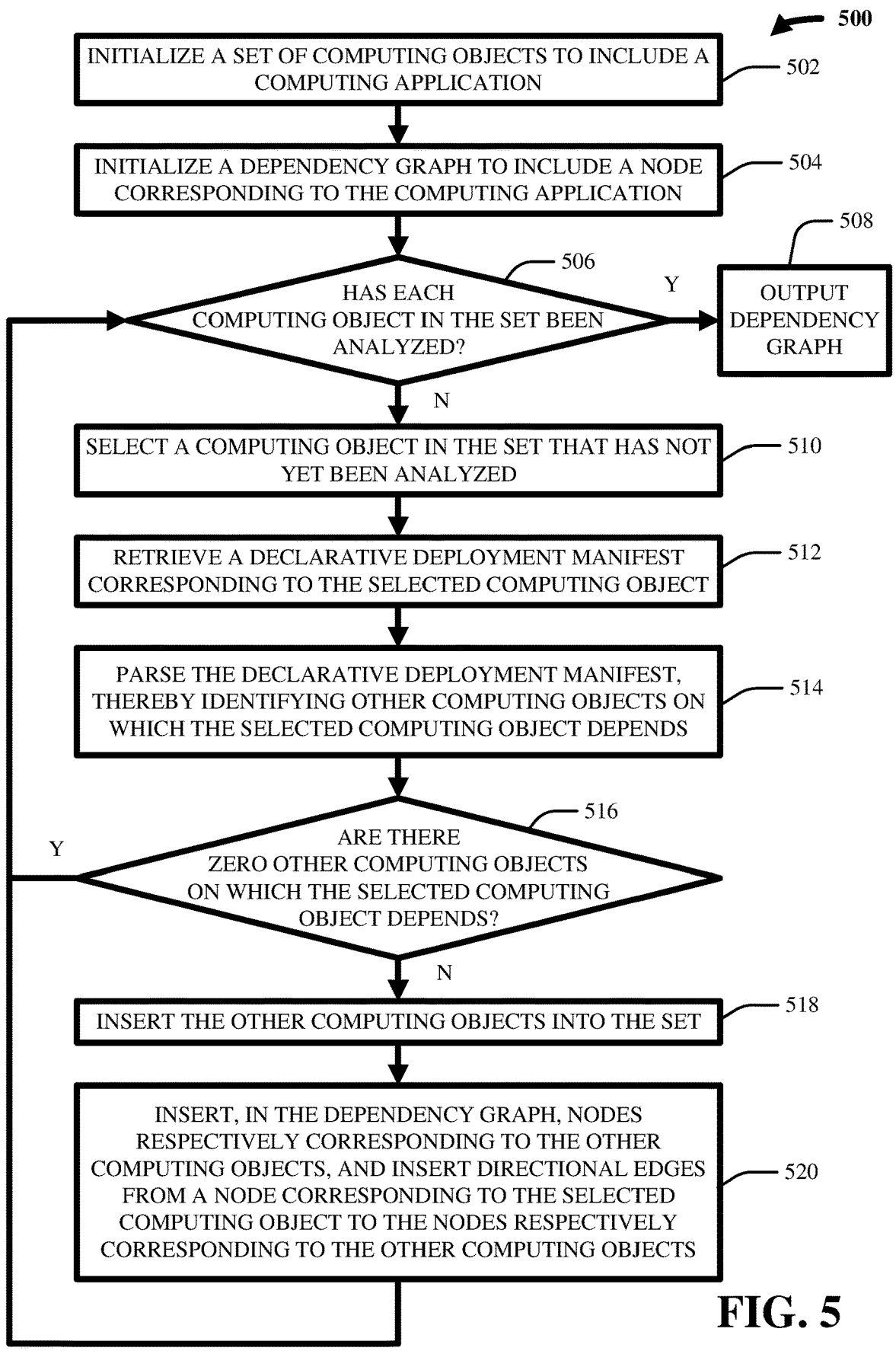
FIG. 5 illustrates a flow diagram of an example, non-limiting computer-implemented method that facilitates constructing a dependency topology based on declarative deployment manifests in accordance with one or more embodiments described herein.

FIG. 5 illustrates a flow diagram of an example, non-limiting computer-implemented method 500 that can facilitate constructing a dependency topology based on declarative deployment manifests in accordance with one or more embodiments described herein. In other words, FIG. 5 depicts a flow chart that generalizes the non-limiting example discussed with respect to FIGS. 3-4.

In various embodiments, act 502 can include initializing, by a device (e.g., 114) operatively coupled to a processor, a set of computing objects to include a computing application (e.g., 104). Here, the set of computing objects can be considered as a dummy variable and/or dummy set to facilitate iteration. In various instances, act 504 can include initializing, by the device (e.g., 114), a dependency graph (e.g., 202) to include a node (e.g., 402) corresponding to the computing application (e.g., 104).

In various aspects, act 506 can include determining, by the device (e.g., 114), whether each computing object in the set has been analyzed and/or considered by the device. If so, the computer-implemented method 500 can proceed to act 508. If not, the computer-implemented method 500 can proceed to act 510.

In various cases, act 508 can include outputting, by the device (e.g., 114), the dependency graph.

In various instances, act 510 can include selecting, by the device (e.g., 114), a computing object in the set that has not yet been analyzed and/or considered by the device.

In various aspects, act 512 can include retrieving, by the device (e.g., 114), a declarative deployment manifest (e.g., one of 106, such as 302) corresponding to the selected computing object.

In various cases, act 514 can include parsing, by the device (e.g., 114), the declarative deployment manifest, thereby identifying other computing objects (e.g., A and/or B) on which the selected computing object depends (e.g., directly depends).

In various instances, act 516 can include determining, by the device (e.g., 114), whether there are zero other computing objects on which the selected computing object depends. If so, the computer-implemented method 500 can proceed back to act 506. If not, the computer-implemented method 500 can proceed to act 518.

In various aspects, act 518 can include inserting, by the device (e.g., 114), the other computing objects into the set.

In various cases, act 520 can include inserting, by the device (e.g., 114) and in the dependency graph, nodes (e.g., 404 and/or 406) respectively correspondingly to the other computing objects, and inserting, by the device in the dependency graph, directional edges from a node corresponding to the selected computing object (e.g., 402) to the nodes respectively corresponding to the other computing objects (e.g., 404 and/or 406). In various cases, the device can further assign to each node configuration parameters that correspond to the computing object associated with the node (e.g., such configuration parameters can be declared in the declarative deployment manifest of the computing object associated with the node).

In various instances, the computer-implemented method 500 can iterate until each computing object in the set has been analyzed. At such point, the dependency graph can be considered as complete.

Figure 6:
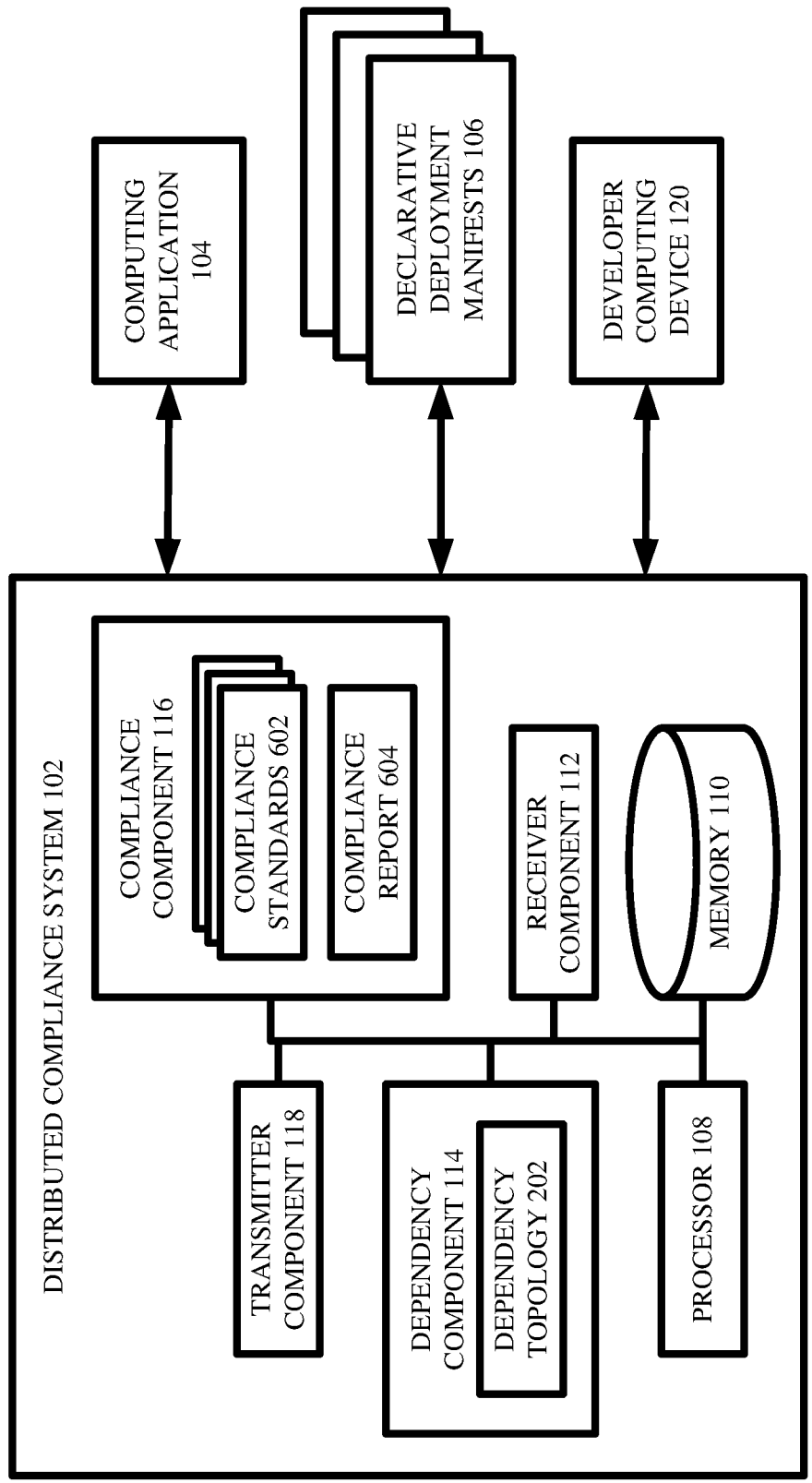
FIG. 6 illustrates a block diagram of an example, non-limiting system including compliance standards and a compliance report that facilitates compliance enforcement via service discovery analytics in accordance with one or more embodiments described herein.

FIG. 6 illustrates a block diagram of an example, non-limiting system 600 including compliance standards and a compliance report that can facilitate compliance enforcement via service discovery analytics in accordance with one or more embodiments described herein. As shown, the system 600 can, in some cases, comprise the same components as the system 200, and can further comprise a set of compliance standards 602 and/or a compliance report 604.

In various embodiments, the compliance component 116 can electronically access the set of compliance standards 602. In various cases, the set of compliance standards 602 can be stored either remotely from and/or locally to the compliance component 116. In various aspects, the set of compliance standards 602 can include any suitable rules and/or regulations that govern the configuration parameters of the computing application 104 and/or of the computing objects on which the computing application 104 depends. In other words, the set of compliance standards 602 can be considered as specifying which configuration parameters would be acceptable for the computing application 104 to have and/or for the downstream computing objects to have. For example, the set of compliance standards 602 can be any suitable benchmarks and/or controls that are promulgated by the Center for Internet Security.

In various cases, the compliance component 116 can electronically perform a compliance check on the computing application 104, by iterating through each node in the dependency topology 202, by determining whether the configuration parameters assigned to the node under consideration satisfy the set of compliance standards 602, and/or by determining whether the configuration parameters of the node under consideration are compatible with the configuration parameters of each node on which the node under consideration depends.

To help clarify this, consider again the non-limiting embodiment of the dependency topology 202 shown in FIG. 4. In such case, the compliance component 116 can begin with the node 402. In various aspects, the compliance component 116 can determine whether the configuration parameters 304 that correspond to the node 402 satisfy the set of compliance standards 602. If so, the compliance component 116 can determine that the node 402 is individually compliant. If not, the compliance component 116 can determine that the node 402 is not individually compliant. Additionally, since the node 402 depends directly upon the node 404, the compliance component 116 can, in various instances, determine whether the configuration parameters 304 corresponding to the node 402 are consistent with and/or otherwise compatible with the configuration parameters 310 corresponding to the node 404. If so (e.g., if the computing application 104 and the computing object A implement compatible communication/security protocols), the compliance component 116 can determine that the node 402 can properly communicate with the node 404. If not (e.g., if the computing application 104 and the computing object A implement incompatible communication/security protocols), the compliance component 116 can determine that the node 402 cannot properly communicate with the node 404.

Those having ordinary skill in the art will appreciate that, in various embodiments, for any given configuration parameter of any given node in the dependency topology 202, the compliance component 116 can access any suitable electronic records (not shown) that specify other configuration parameters that are compatible with and/or incompatible with the given configuration parameter. Accordingly, the compliance component 116 can determine whether the configuration parameters of one node are compatible with the configuration parameters of another node by referencing and/or leveraging such electronic records.

In various cases, the compliance component 116 can then move on to the node 404. In various instances, the compliance component 116 can determine whether the configuration parameters 310 that correspond to the node 404 satisfy the set of compliance standards 602. If so, the compliance component 116 can determine that the node 404 is individually compliant. If not, the compliance component 116 can determine that the node 404 is not individually compliant.

Moreover, since the node 404 depends directly upon the node 408, the compliance component 116 can, in various instances, determine whether the configuration parameters 310 corresponding to the node 404 are consistent with and/or otherwise compatible with the configuration parameters corresponding to the node 408. If so (e.g., if the computing object A and the computing object C implement compatible communication/security protocols), the compliance component 116 can determine that the node 404 can properly communicate with the node 408. If not (e.g., if the computing object A and the computing object C implement incompatible communication/security protocols), the compliance component 116 can determine that the node 404 cannot properly communicate with the node 408.

In various aspects, the compliance component 116 can repeat this analysis for each node in the dependency topology 202. In some cases, this can be considered as performing port scanning on each node by analyzing the declarative deployment manifest corresponding to that node, rather than by connecting to a running instance of the node. If each node in the dependency topology 202 is individually compliant with the set of compliance standards 602, and if each node in the dependency topology 202 can properly communicate with every node on which it directly depends, the compliance component 116 can conclude that the computing application 104 is ultimately compliant. On the other hand, if at least one node in the dependency topology 202 is individually non-compliant with the set of compliance standards 602, or if at least one node in the dependency topology 202 cannot properly communicate with at least one node on which it directly depends, the compliance component 116 can conclude that the computing application 104 is ultimately non-compliant.

In various instances, the compliance component 116 can electronically generate a compliance report 604, which can be any suitable electronic file that summarizes and/or otherwise indicates the results of the above-described comparisons, determinations, and/or conclusions made by the compliance component 116.

Figure 7:
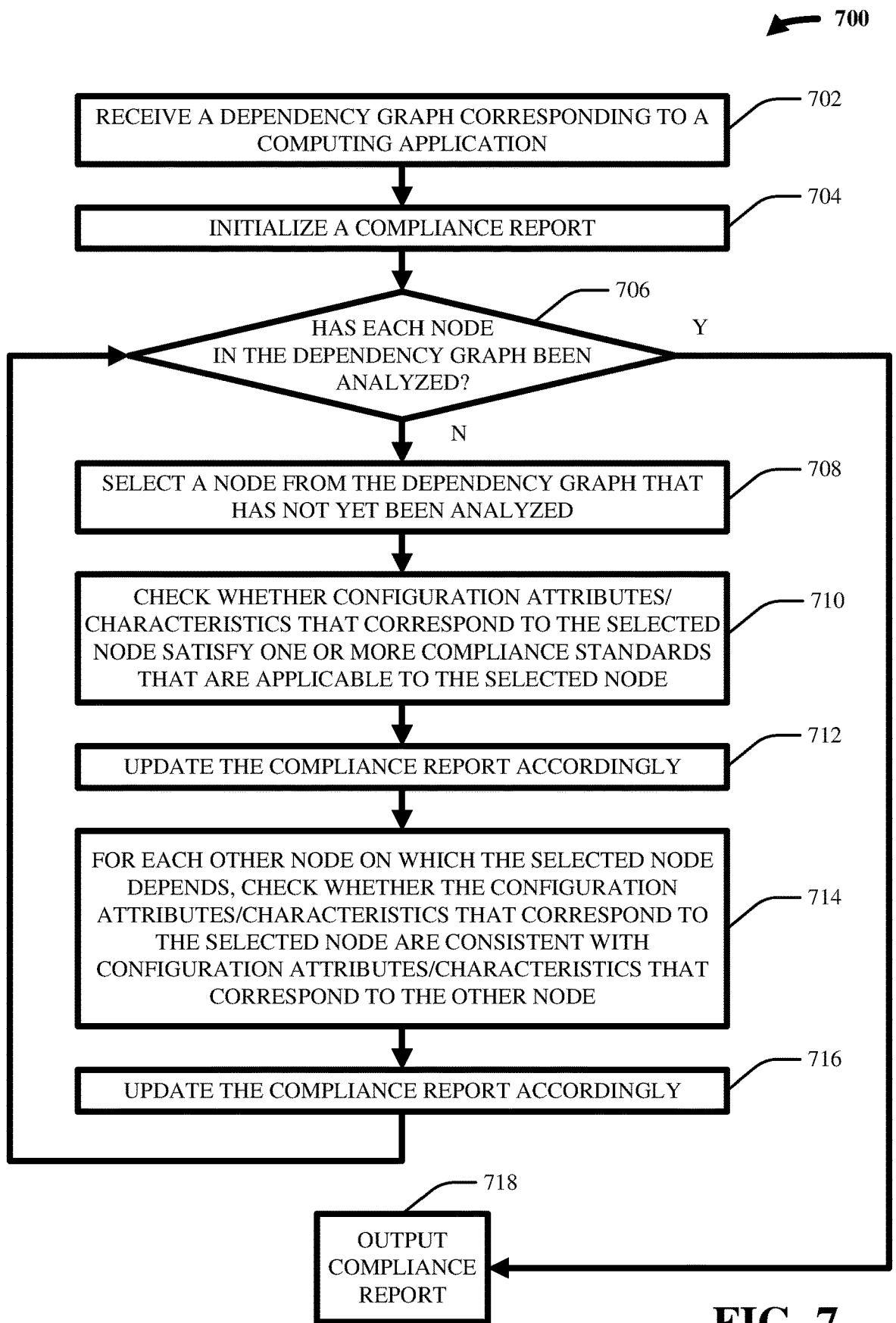
FIG. 7 illustrates a flow diagram of an example, non-limiting computer-implemented method that facilitates performing a compliance check by leveraging a dependency topology in accordance with one or more embodiments described herein.

FIG. 7 illustrates a flow diagram of an example, non-limiting computer-implemented method 700 that can facilitate performing a compliance check by leveraging a dependency topology in accordance with one or more embodiments described herein. In other words, FIG. 7 depicts a flow chart that generalizes the non-limiting example discussed with respect to FIG. 6.

In various embodiments, act 702 can include receiving, by a device (e.g., 116) operatively coupled to a processor, a dependency graph (e.g., 202) corresponding to a computing application (e.g., 104).

In various instances, act 704 can include initializing, by the device (e.g., 116), a compliance report (e.g., 604).

In various aspects, act 706 can include determining, by the device (e.g., 116), whether each node in the dependency graph has been analyzed and/or considered yet by the device. If so, the computer-implemented method 700 can proceed to act 718. If not, the computer-implemented method 700 can proceed to act 708.

In various cases, act 708 can include selecting, by the device (e.g., 116), a node (e.g., 402) from the dependency graph that has not yet been analyzed and/or considered by the device.

In various instances, act 710 can include checking, by the device (e.g., 116), whether configuration attributes/characteristics (e.g., 304) that correspond to the selected node satisfy one or more compliance standards (e.g., 602) that are applicable to the selected node.

In various aspects, act 712 can include updating, by the device (e.g., 116), the compliance report accordingly. For example, if the configuration attributes/characteristics that correspond to the selected node do satisfy the one or more compliance standards, the compliance report can be updated to indicate that the selected node is individually compliant with the one or more compliance standards. On the other hand, if the configuration attributes/characteristics that correspond to the selected node do not satisfy the one or more compliance standards, the compliance report can be updated to indicate that the selected node is individually non-compliant with the one or more compliance standards.

In various cases, act 714 can include, for each other node (e.g., 404 and/or 406) on which the selected node depends (e.g., directly depends), checking, by the device (e.g., 116), whether the configuration attributes/characteristics that correspond to the selected node are consistent and/or compatible with configuration attributes/characteristics (e.g., 310 and/or 316) that correspond to the other node on which the selected node depends.

In various instances, act 716 can include updating, by the device (e.g., 116), the compliance report accordingly. For example, if the configuration characteristics/attributes that correspond to the selected node are consistent/compatible with the configuration characteristics/attributes that correspond to another node on which the selected node depends, the compliance report can be updated to indicate that the selected node can properly communicate and/or operate with the other node. On the other hand, if the configuration characteristics/attributes that correspond to the selected node are not consistent/compatible with the configuration characteristics/attributes that correspond to another node on which the selected node depends, the compliance report can be updated to indicate that the selected node cannot properly communicate and/or operate with the other node.

In various aspects, act 718 can include outputting, by the device (e.g., 116), the compliance report.

In various instances, the computer-implemented method 700 can iterate until all nodes in the dependency graph have been analyzed. At such point, the compliance report can be considered as complete.

In various aspects, once the compliance component 116 generates the compliance report 604, the transmitter component 118 can electronically transmit the compliance report 604 to the developer computing device 120 and/or to any other suitable computing device as desired.

In various embodiments, the above discussion describes how the dependency component 114 can electronically build the dependency topology 202 based on the set of declarative deployment manifests 106, and/or describes how the compliance component 116 can electronically determine a compliance status of the computing application 104 by analyzing the dependency topology 202.

In various aspects, the compliance component 116 can be triggered to analyze the dependency topology 202 when the dependency component 114 has finished constructing the dependency topology 202. In other words, the compliance component 116 can, in various embodiments, perform a compliance check whenever the dependency component 114 provides a new dependency topology 202.

In various instances, the dependency component 114 can be triggered to electronically construct the dependency topology 202 whenever any of the set of declarative deployment manifests 106 are edited and/or changed (e.g., such as by a software developer). That is, whenever a developer of the computing application changes and/or modifies the set of declarative deployment manifests 106, the dependency component 114 can build a new dependency topology 202 based on the changed and/or modified set of declarative deployment manifests 106. In other cases, however, the dependency component 114 can be triggered to electronically construct the dependency topology 202 regularly and/or at any suitable periodic time intervals (e.g., even if no edits have been made to the set of declarative deployment manifests 106).

Figure 8:
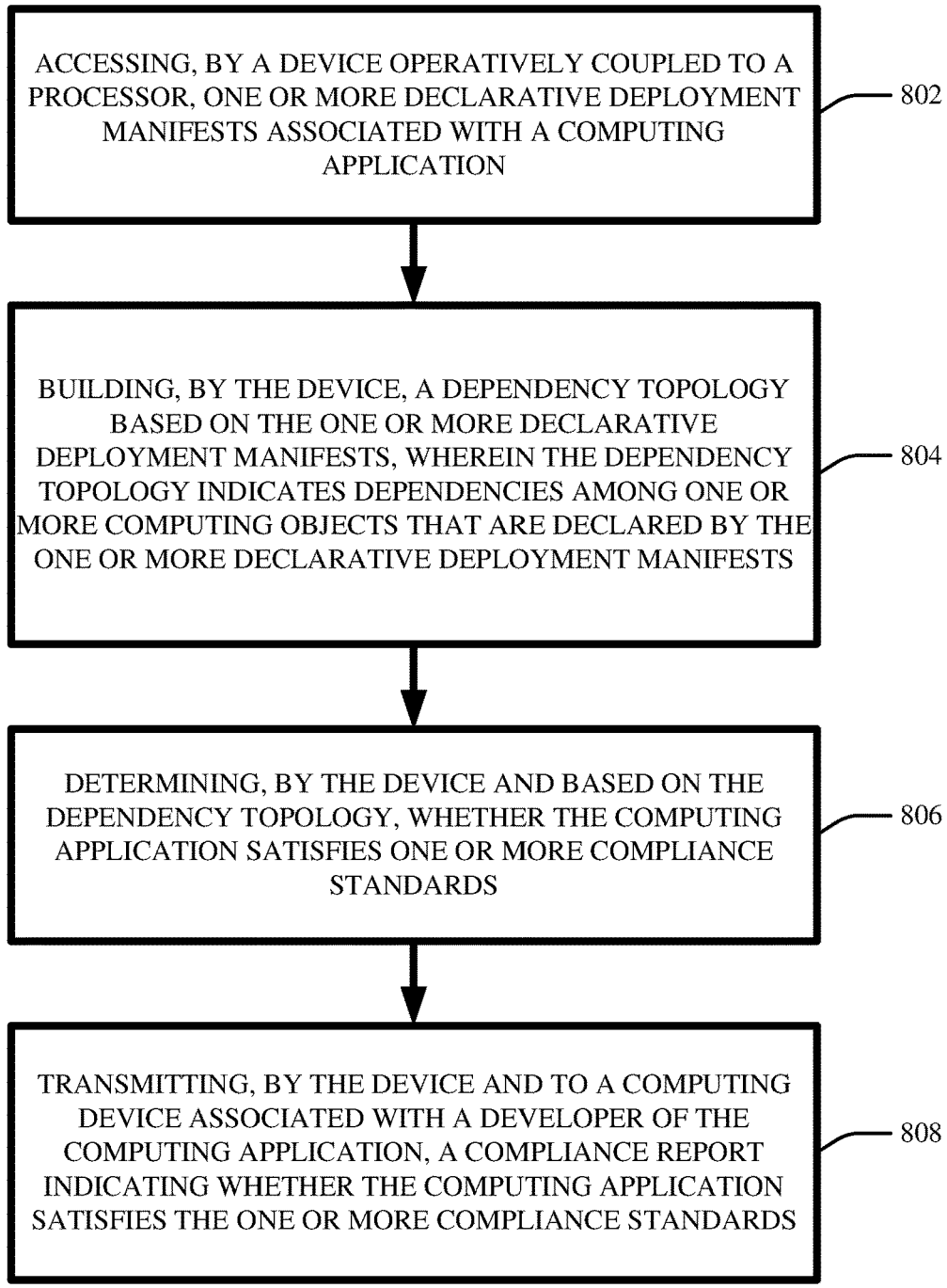
FIG. 8 illustrates a flow diagram of an example, non-limiting computer-implemented method that facilitates compliance enforcement via service discovery analytics in accordance with one or more embodiments described herein.

FIG. 8 illustrates a flow diagram of an example, non-limiting computer-implemented method 800 that can facilitate compliance enforcement via service discovery analytics in accordance with one or more embodiments described herein. In various embodiments, the computer-implemented method 800 can be facilitated by the distributed compliance system 102.

In various embodiments, act 802 can include accessing, by a device (e.g., via the receiver component 112) operatively coupled to a processor, one or more declarative deployment manifests (e.g., the set of declarative deployment manifests 106) associated with a computing application (e.g., the computing application 104).

In various instances, act 804 can include building, by the device (e.g., via the dependency component 114), a dependency topology (e.g., the dependency topology 202) based on the one or more declarative deployment manifests. In various cases, the dependency topology can indicate dependencies among one or more computing objects (e.g., the computing object A, the computing object B, the computing object C, the computing object D, the computing object E, and/or the computing object F, as shown in FIG. 4) that are declared by the one or more declarative deployment manifests.

In various aspects, act 806 can include determining, by the device (e.g., via the compliance component 116) and based on the dependency topology, whether the computing application satisfies one or more compliance standards (e.g., the set of compliance standards 602).

In various instances, act 808 can include transmitting, by the device (e.g., via the transmitter component 118) and to a computing device (e.g., the developer computing device 120) associated with a developer of the computing application, a compliance report (e.g., the compliance report 604) indicating whether the computing application satisfies the one or more compliance standards.

Although not explicitly shown in FIG. 8, the determining whether the computing application satisfies the one or more compliance standards can comprise: determining, by the device (e.g., via the compliance component 116), whether the dependencies among the plurality of computing objects satisfy the one or more compliance standards.

Although not explicitly shown in FIG. 8, the determining whether the computing application satisfies the one or more compliance standards can occur during a development stage of the computing application and/or prior to a runtime/deployment stage of the computing application.

Although not explicitly shown in FIG. 8, the computer-implemented method 800 can further comprise: detecting, by the device (e.g., via the dependency component 114), an edit made to the one or more declarative deployment manifests, wherein the building the dependency topology can be based on the detecting the edit, and wherein the determining whether the computing application satisfies the one or more compliance standards can be based on the building the dependency topology.

Although not explicitly shown in FIG. 8, the building the dependency topology can comprise: textually parsing, by the device (e.g., via the dependency component 114), the one or more declarative deployment manifests.

In various embodiments, the above discussion describes how the distributed compliance system 102 can perform a compliance check on the computing application 104, based on the set of declarative deployment manifests 106. However, this is a non-limiting example. In some cases, the distributed compliance system 102 can perform a compliance check on the computing application 104 by analyzing and/or parsing source code (e.g., executable scripts) of the computing application 104. By analyzing such source code, the distributed compliance system 102 can identify computing objects which are directly called/invoked by the computing application 104. Once such computing objects are identified, the dependency component 114 can then analyze and/or parse the source code of such computing objects to identify other computing objects which are indirectly called/invoked by the computing application 104. In other words, various embodiments of the invention can involve parsing the set of declarative deployment manifests 106 in order to build the dependency topology 202, which can then be leveraged to perform a compliance check. However, various other embodiments of the invention can involve parsing source code in order to build the dependency topology 202.

Various embodiments described herein encompass a computerized tool that can electronically perform a compliance check on a distributed computing application. As described herein, such a computerized tool can function without having to actually execute the distributed computing application. Moreover, as described herein, such a computerized tool can function without relying upon any predetermined distributed structure that is already known to be compliant. In various cases, the computerized tool can analyze declarative deployment manifests and/or source code associated with the distributed computing application. By parsing such declarative deployment manifests and/or source code, the computerized tool can identify computing objects (e.g., deployment artifacts) on which the distributed computing application depends. In various instances, the computerized tool can construct an internal representation (e.g., a dependency graph) that shows the interactions and/or dependencies among such computing objects. In various cases, for each computing object, the computerized tool can check that the configuration parameters of the computing object are compliant. Moreover, for each given computing object, the computerized tool can check whether the configuration parameters of the computing object are compatible with configuration parameters of another computing object on which the given computing object depends (e.g., can check whether the two computing objects are utilizing compatible communication and/or security protocols).

Those having ordinary skill in the art will appreciate that the herein disclosure describes non-limiting examples of various embodiments of the invention. For ease of description and/or explanation, various portions of the herein disclosure utilize the term "each" when discussing various embodiments of the invention. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the invention, and it should be further understood that, in various other embodiments of the invention, it can be the case that such description applies to fewer than "each" of that particular computerized object.

Figure 9:
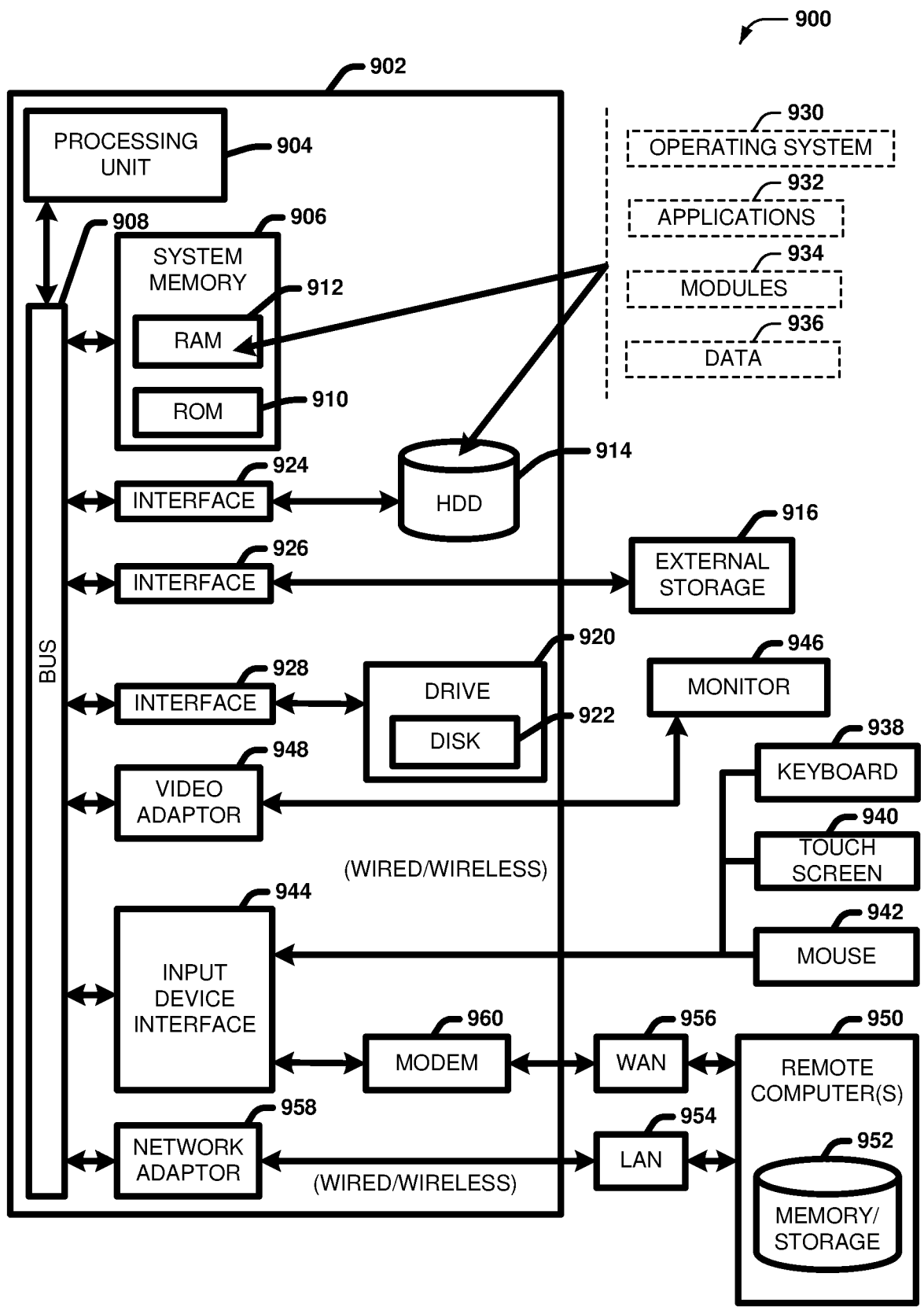
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, and/or data structures that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader) and a drive 920, e.g., such as a solid state drive, an optical disk drive, which can read or write from a disk 922, such as a CD-ROM disc, a DVD, and/or a BD. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, and/or a BLUETOOTH® interface.

A monitor 946 or other type of display device can be also connected to the system bus 908 via an interface, such as a video adapter 948. In addition to the monitor 946, a computer typically includes other peripheral output devices (not shown), such as speakers and/or printers.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
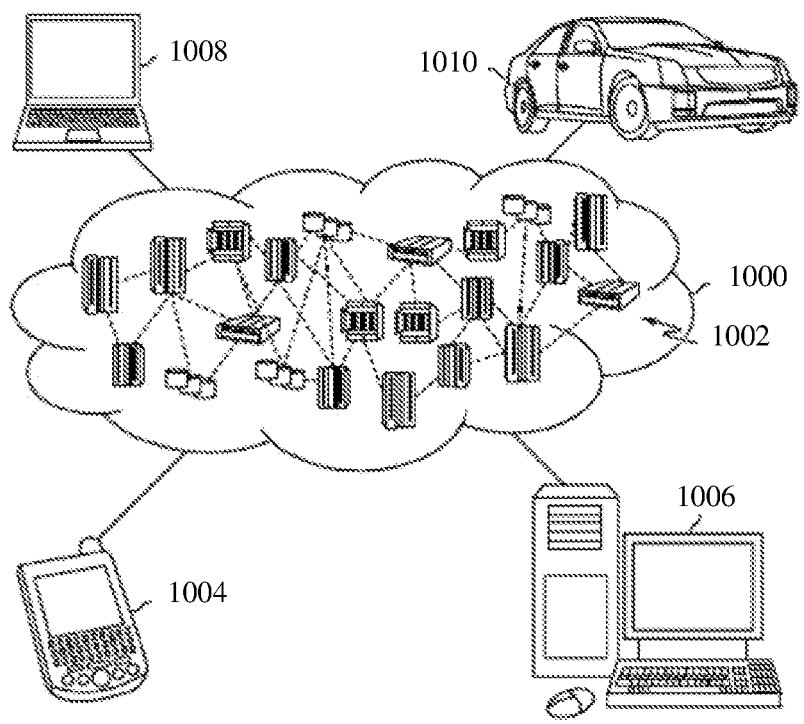
FIG. 10 illustrates an example, non-limiting cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
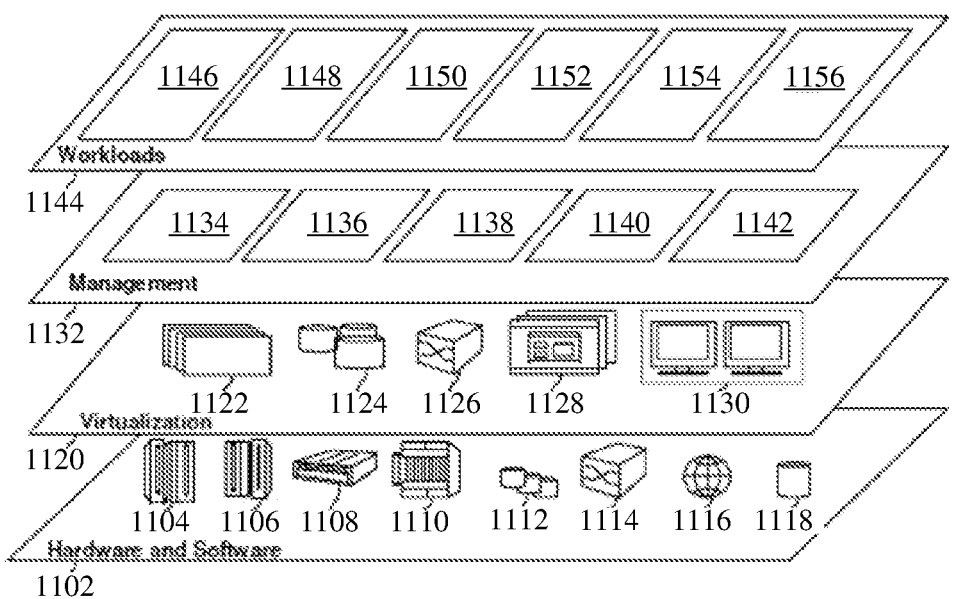
FIG. 11 illustrates example, non-limiting abstraction model layers in accordance with one or more embodiments described herein.

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and differentially private federated learning processing 1156. Various embodiments of the present invention can utilize the cloud computing environment described with reference to FIGS. 10 and 11 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, and/or data structures, that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    accessing, by a device operatively coupled to a processor, one or more declarative deployment manifests associated with a computing application;
    building, by the device, a dependency topology based on the one or more declarative deployment manifests, wherein the dependency topology indicates dependencies among one or more computing objects that are declared by the one or more declarative deployment manifests; and
    determining, by the device and based on the dependency topology, whether the computing application satisfies one or more compliance standards, wherein determination of whether the computing application satisfies the one or more compliance standards comprises:
        identifying a second node on which a first node directly depends, wherein the first node is in the dependency topology;
        first determining of whether configuration parameters of the first node and the second set of configuration parameters of the second node are compatible or consistent by electronically comparing the second set of configuration parameters of the second node with the configuration parameters of the first node; and
        second determining that communication can properly or compliantly be facilitated between the first node and the second node based on the electronically comparing the second set of configuration parameters of the second node with the configuration parameters of the first node.

2. The computer-implemented method of claim 1, wherein the determining whether the computing application satisfies the one or more compliance standards occurs during a development stage of the computing application or prior to a runtime stage of the computing application.

3. The computer-implemented method of claim 1, further comprising:
    detecting, by the device, an edit made to the one or more declarative deployment manifests, wherein the building the dependency topology is based on the detecting the edit, and wherein the determining whether the computing application satisfies the one or more compliance standards is based on the building the dependency topology.

4. The computer-implemented method of claim 1, further comprising:
    transmitting, by the device and to a computing device associated with a developer of the computing application, a compliance report indicating whether the computing application satisfies the one or more compliance standards.

5. The computer-implemented method of claim 1, wherein the building the dependency topology comprises:
   textually parsing, by the device, the one or more declarative deployment manifests.

6. A system, comprising:
   a central processing unit (CPU) that executes computer-executable components stored in a computer-readable memory, the computer-executable components comprising:
      a receiver component that accesses one or more declarative deployment manifests associated with a computing application;
      a dependency component that builds a dependency topology based on the one or more declarative deployment manifests, wherein the dependency topology indicates dependencies among one or more computing objects that are declared by the one or more declarative deployment manifests; and
      a compliance component that determines, based on the dependency topology, whether the computing application satisfies one or more compliance standards, wherein determination of whether the computing application satisfies the one or more compliance standards comprises:
         identification of a second node on which a first node directly depends, wherein the first node is in the dependency topology;
         first determination of whether configuration parameters of the first node and the second set of configuration parameters of the second node are compatible or consistent by electronically comparing the second set of configuration parameters of the second node with the configuration parameters of the first node; and
         second determination that communication can properly or compliantly be facilitated between the first node and the second node based on the electronically comparing the second set of configuration parameters of the second node with the configuration parameters of the first node.

7. The system of claim 6, wherein the compliance component determines whether the computing application satisfies the one or more compliance standards during a development stage of the computing application or prior to a runtime stage of the computing application.

8. The system of claim 6, wherein the dependency component builds the dependency topology in response to detection of an edit being made to the one or more declarative deployment manifests, and wherein the compliance component determines whether the computing application satisfies the one or more compliance standards in response to the dependency component building the dependency topology.

9. The system of claim 6, wherein the computer-executable components further comprise:
   a transmitter component that transmits, to a computing device associated with a developer of the computing application, a compliance report indicating whether the computing application satisfies the one or more compliance standards.

10. The system of claim 6, wherein the dependency component builds the dependency topology by textually parsing the one or more declarative deployment manifests.

11. The system of claim 6, the compliance component further:
   for the first node, electronically compares configuration parameters assigned to the first node with a set of compliance standards;
   based on the comparison, label the first node as either individually compliant or individually non-compliant;
   if a third determination is made that all nodes in the dependency topology are individually compliant, and if a fourth determination is made that electronic communication can be properly or compliantly facilitated between each pair of connected nodes in the dependency topology, forming a conclusion that the computing application compliant.

12. The system of claim 6, the compliance component further:
   for the first node, electronically compares configuration parameters assigned to the first node with a set of compliance standards;
   based on the comparison, label the first node as either individually compliant or individually non-compliant;
   if a third determination is made that at least one node of the nodes in the dependency topology is not individually compliant or if a fourth determination is made that electronic communication cannot be properly or compliantly facilitated between at least one pair of connected nodes in the dependency topology, forming a conclusion that the computing application is not compliant.

13. A computer program product for facilitating compliance enforcement via service discovery analytics, the computer program product comprising a computer-readable memory having program instructions embodied therewith, the program instructions executable by a processor to cause the processor to:
   access, by the processor, one or more declarative deployment manifests associated with a computing application;
   build, by the processor, a dependency topology based on the one or more declarative deployment manifests, wherein the dependency topology indicates dependencies among one or more computing objects that are declared by the one or more declarative deployment manifests; and
   determine, by the processor and based on the dependency topology, whether the computing application satisfies one or more compliance standards, wherein determination of whether the computing application satisfies the one or more compliance standards comprises:
      identification of a second node on which a first node directly depends, wherein the first node is in the dependency topology;
      first determination of whether configuration parameters of the first node and the second set of configuration parameters of the second node are compatible or consistent by electronically comparing the second set of configuration parameters of the second node with the configuration parameters of the first node; and
      second determination that communication can properly or compliantly be facilitated between the first node and the second node based on the electronically comparing the second set of configuration parameters of the second node with the configuration parameters of the first node.

14. The computer program product of claim 13, wherein the processor determines whether the computing application satisfies the one or more compliance standards during a development stage of the computing application or prior to a runtime stage of the computing application.

15. The computer program product of claim 13, wherein the program instructions are further executable to cause the processor to:
    detect, by the processor, an edit made to the one or more declarative deployment manifests, wherein the processor builds the dependency topology based on detecting the edit, and wherein the processor determines whether the computing application satisfies the one or more compliance standards based on building the dependency topology.

16. The computer program product of claim 13, wherein the program instructions are further executable to cause the processor to:
    transmit, by the processor and to a computing device associated with a developer of the computing application, a compliance report indicating whether the computing application satisfies the one or more compliance standards.

\* \* \* \* \*